United States Patent [19]
Sabottke

[11] Patent Number: 5,188,805
[45] Date of Patent: Feb. 23, 1993

[54] CONTROLLING TEMPERATURE IN A FLUID HYDROCARBON CONVERSION AND CRACKING APPARATUS AND PROCESS COMPRISING A NOVEL FEED INJECTION SYSTEM

[75] Inventor: Craig Y. Sabottke, Morris Township, Morris County, N.J.

[73] Assignee: Exxon Research and Engineering Company, Florham Park, N.J.

[21] Appl. No.: 548,476

[22] Filed: Jul. 3, 1990

[51] Int. Cl.⁵ ............................................. G05D 7/00
[52] U.S. Cl. .................................... 422/111; 208/113; 208/153; 208/157; 239/583; 239/63; 422/110; 422/140; 422/214
[58] Field of Search ................ 422/140, 214, 110–111, 422/105–112; 239/63, 583, 75; 208/113, 153, 157, DIG. 1

[56] References Cited

U.S. PATENT DOCUMENTS

| | | | |
|---|---|---|---|
| 2,513,720 | 7/1950 | Hallinan | 239/75 |
| 2,957,307 | 10/1960 | Bradenberger et al. | 239/75 X |
| 3,152,065 | 10/1964 | Sharp et al. | 422/140 X |
| 3,317,184 | 5/1967 | Usry | 239/583 |
| 4,116,639 | 9/1978 | Fross | 422/111 |
| 4,263,091 | 4/1981 | King | 239/75 X |
| 4,427,537 | 1/1984 | Dean et al. | 422/140 X |
| 4,434,049 | 2/1984 | Dean et al. | 208/153 |
| 4,511,083 | 4/1985 | Muller-Girard | 239/75 X |
| 4,529,573 | 7/1985 | Varady | 422/144 X |
| 4,670,221 | 6/1987 | Marnet et al. | 422/107 |
| 4,778,658 | 10/1988 | Nielsen | 422/214 X |
| 4,850,853 | 7/1989 | Gruber et al. | 239/75 X |

Primary Examiner—Robert J. Warden
Assistant Examiner—Amalia L. Santiago
Attorney, Agent, or Firm—Chris Konkol; Henry E. Naylor

[57] ABSTRACT

The invention is directed to a process and apparatus for controlling reactor temperature and/or carbon and heat balance in a fluid hydrocarbon conversion and cracking unit. In particular, the invention is directed to a process wherein the introduction of feed into a conversion and cracking zone is effected by a feed injector which optimizes the atomization of the feed in order to achieve reactor temperature and/or carbon and heat balance control objectives. This invention is applicable to fluid coking, fluid coking with gasification, asphaltene residuum treating (ART), and other petroleum industry processes.

16 Claims, 13 Drawing Sheets

CONTROLLING TEMPERATURE IN A FLUID HYDROCARBON CONVERSION AND CRACKING APPARATUS AND PROCESS COMPRISING A NOVEL FEED INJECTION SYSTEM

This invention is directed to a process for controlling reactor temperature and/or carbon and heat balance in a fluid hydrocarbon conversion and cracking process. In particular, the invention is directed to a process wherein the introduction of feed into a fluid hydrocarbon conversion and cracking zone is effected by feed injectors which optimize the atomization of the feed in order to achieve reactor temperature control objectives and/or manipulate the carbon and heat balance of the process.

BACKGROUND OF THE INVENTION

In the petroleum refining industry, the fluidized hydrocarbon conversion and cracking of hydrocarbons is well known and may be accomplished in a variety of processes which employ fluidized solid techniques. For example, U.S. Pat. No. 2,881,130 discloses a basic fluid coking process. U.S. Pat. Nos. 3,661,543; 3,702,516; 3,759,676 and 4,055,484 disclose a fluid coking process incorporating gasification of product ore to convert heavy carbonaceous material such as petroleum residium (1050° F.+) to distillate, naphtha and gaseous products in an integrated process. U.S. Pat. No. 4,325,815 discloses a catalytic fluid coking and gasification process where catalytic partially gasified coke particles are produced in situ to enhance the fundamental fluid coking and gasification process.

U.S. Pat. Nos. 3,803,023 and 3,726,791 disclose an integrated coking and gasification process in which a hydrogen rich gas is produced by steam gasification. U.S. Pat. No. 3,537,975 discloses a combination catalytic cracking and fluid coking process where heavy catalytic cracking fractionator bottoms are cracked in a transferline. The transferline effluent is discharged into the upper part of the coker reactor. The teachings of the above referenced patents are hereby incorporated by reference to illustrate a few types of fluidized hydrocarbon conversion and cracking processes, among others, to which this invention may be applied.

Normally in fluidized hydrocarbon conversion and cracking processes, relatively high molecular weight hydrocarbon liquids and/or vapors are contacted with hot, finely-divided, solid particles (e.g. in situ developed coke ore particles, catalytically enhanced coke ore particles, a mixture of coke and catalyst particles or a mixture of coke and other solid particles beneficial to the process) either in a fluidized bed reaction zone or in an elongated riser reaction zone, or some combination of these, and maintained at an elevated temperature in a fluidized state for a period of time sufficient to effect the desired degree of cracking and conversion to lower molecular weight hydrocarbons typical of those present in refinery gases, naphthas (motor gasolines) and distillate fuels boiling ranges.

During the conversion and cracking reaction, coke and feed contaminants (e.g. metals) are deposited on the solid particles in the reaction zone, thereby altering the effectiveness and activity of these solid particles for conversion and cracking reactions and the selectivity of the conversion products for producing gas, naphtha and distillate stocks. In order to restore a portion, preferably a major portion, of the effectiveness and activity to the feed coke-contaminated solid particles (spent particles), these particles are transferred from the reaction zone into other zones (heater, gasification, regeneration, etc.). Typically these zones comprise large vertical cylindrical vessels wherein the spent solid particles are maintained as a fluidized bed by the upward passage of an oxygen-containing regeneration gas, such as air, under conditions to burn at least a portion, preferably a major portion, of the feed derived coke from these solid particles. The regenerated solid particles are subsequently withdrawn from these various zones and eventually, after suitable and beneficial treatment steps, reintroduced back into the reaction zone for reaction with additional hydrocarbon feed.

In processes for fluid coking, or fluid coking with gasification, commercial practice has been to employ fixed throat feed injectors. Such fixed throat feed injectors are usually designed on a forecast basis and optimized for a certain feed quality. In the actual plant operation, however, feed quality is usually different from the forecast basis, since business objectives change with time. For these reasons, most conventional fluid hydrocarbon conversion and cracking units are not exerting complete control of the reaction system.

Furthermore, it is current practice with commercial plant operations to practice multivariable constraint control to maximize refinery profits on a continuous basis. An important process variable is the reactor temperature, since it has a major impact on reactor product yield and quality. For example the naphtha and distillate products, both light and heavy gas oils, from a typical fluid hydrocarbon conversion and cracking process form a major portion of the overall refinery intermediate feed streams either to onstream blending operations or other process units such as catalytic cracking. In fact, these reactor products are probably one of the most important intermediate steps in the overall refinery upgrading processing sequence. Due to the usually large throughputs, associated with these fluid hydrocarbon conversion and cracking process units, even minor variations of reactor product yields and/or quality can have a significant impact on the operating economics of the refinery. Typically, temperature control of a commercial reactor is within a range of about $\pm 10°$ F. of set point. Improved temperature control, for example within a range of several degrees of set point, and preferably even within 1° and 2° F., is desirable.

Prior art methods of controlling reactor temperature in an endothermic hydrocarbon conversion and cracking process reaction system have been accomplished in various ways, keeping in mind the overall process heat balance and carbon balance must be in harmony. A typical prior art method of controlling temperature is to change the $\Delta P$ (pressure drop) between the reactor and the heater vessel, which pressure drop in turn changes the circulation rate of hot coke solid particles from the heater and thus changes the reactor heat balance and corresponding temperature in the reactor. Another method of controlling temperature is to change the reactor feed temperature and heat content by means of a feed preheater, which again, will change the reactor heat balance and corresponding reactor temperature. The use of a feed preheat furnace to control reactor temperature has limits, however, since it is pegged to the hot solids (coke) circulation rate and there is a large time lag due to the large residence time of the feed in the preheater. Although controlling the solids (coke) circulation rate is more responsive, it is not very precise, since solid slumping or slugging can occur in the transport pipes. Pressure fluctuations adversely affect the flow pattern of the fluidized solid particles in the system. In addition, since the solid particles must pass through one or more valves, changing solid particle circulation rates tends to aggravate mechanical abrasion and can be disruptive to flow pattern.

According to the present invention, finer and more precise temperature control is achieved. There would be less mechanical valve wear and unscheduled shutdowns. A major advantage of the present invention is that a more tuned and more streamlined uniform fluidized solid particles flow pattern can be achieved.

There is a need for better and more continuous maximization of fluid hydrocarbon conversion and cracking processes in terms of unit profitability as well as overall refinery profitability. During the course of a two to three year plant run, there is considerable room for increasing yields and qualities of the reactor products by continuous and precise optimization of the reactor temperature control.

BRIEF DESCRIPTION OF THE INVENTION

It has now been found that by varying the atomization of the feed introduced into a reactor, in conjunction with appropriate control instruments, it is possible to obtain an additional degree of freedom to control and optimize the reactor temperature and/or carbon and heat balance in a fluid hydrocarbon conversion and cracking process. Further, by means of a new kind of variable atomization means feed injection apparatus, the degree of atomization of the feed into a fluid hydrocarbon conversion and cracking zone can be readily varied in real time on a continuous basis, which atomization in turn will affect the endothermic heat of conversion and cracking requirements of the reaction system. The effect of varying feed atomization results in small and subtle changes in the coke producing tendency (coke selectivity) and can be used to control the carbon balance and related heat balance of the process. Further by means of a new kind of variable atomization means feed injector apparatus, a preselected optimal feed liquid droplet size, and/or droplet size distribution, and/or spray pattern can be maintained as desired to control and effect the reactor temperature and/or carbon and heat balance of the reaction system.

According to the present invention, precise control of the fluid hydrocarbon conversion and cracking process reactor temperature is made possible. Compared to prior art processes, the present process allows the circulation of fluidized solid particles to be fixed at a given value for a given feed rate, giving an optimum solid particle/oil contacting ratio. The hydrocarbon feed atomization/spray pattern can be varied slightly as feed properties or other inputs to the process change, in order to maintain a target reactor temperature.

BRIEF DESCRIPTION OF THE DRAWINGS

The process and apparatus of the invention will be more clearly understood upon reference to the detailed discussion below in conjunction with the drawings wherein.

DETAILED DESCRIPTION OF THE INVENTION

Figure 1:
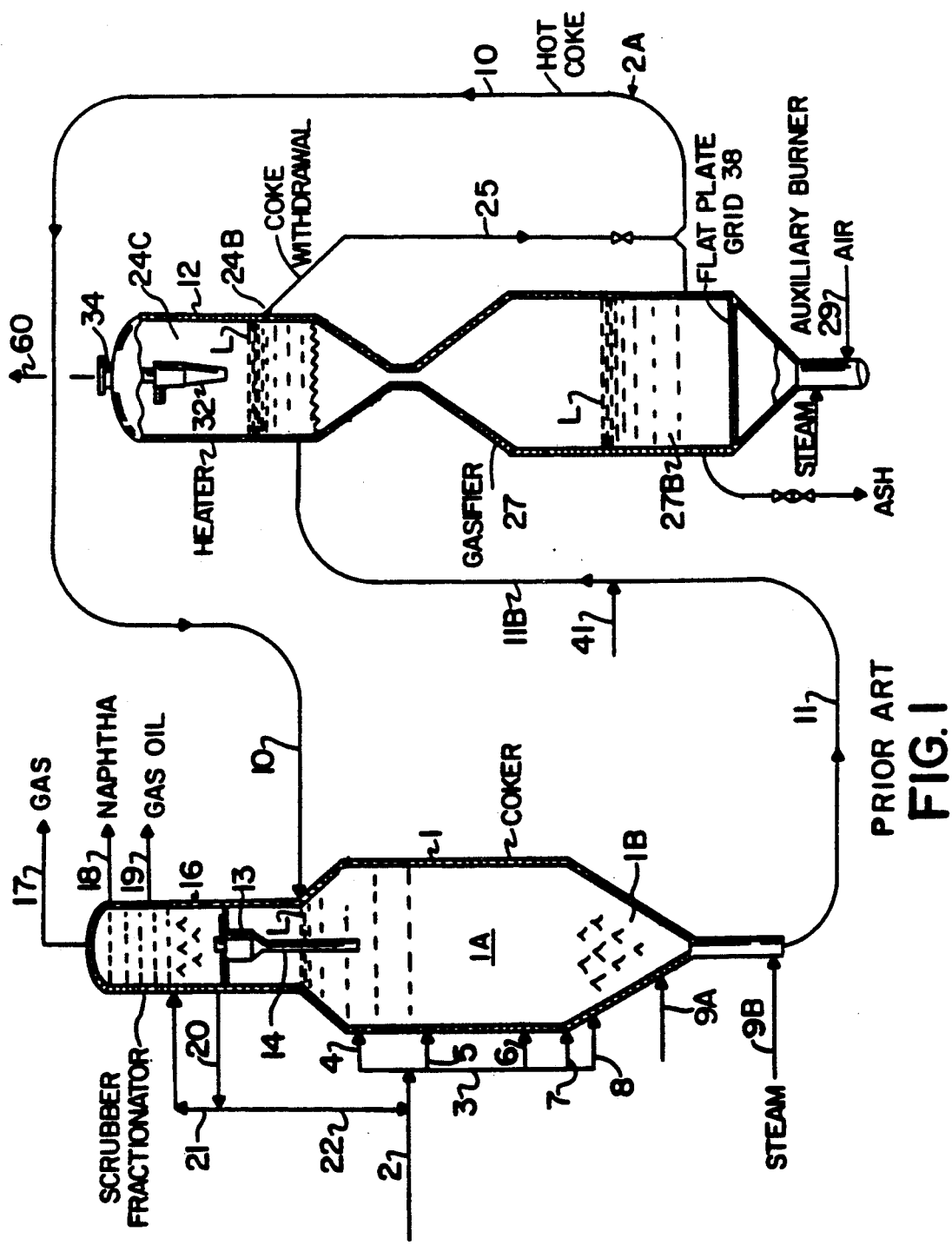
FIG. 1 schematically illustrates one embodiment of a prior art unit for fluid coking with gasification, to which the present invention is applicable.

The invention is directed to a process for controlling temperature in a reactor by controlling and optimizing the atomization of the feed introduced into a hydrocarbon conversion and cracking zone. In a preferred embodiment, to be described in detail below, a plurality of feed injectors, each comprising a variable atomization means thereof, are employed to vary and optimize the feed atomization. By such means, it is possible to optimize reactor temperature and/or carbon and heat balance objectives through application of various new automatic control schemes to be described in detail below.

In this description, the term "atomization", with respect to the effluent from a feed injector, is meant to encompass the following atomization characteristics: the average or mean feed droplet size, droplet size distribution, and spray pattern. Spray pattern refers to spray angles and shape, for example, cone, fan, etc.

In general, a degree of feed atomization characterized by a smaller average droplet size, narrow droplet size distribution, and well dispersed spray pattern will result in less coke and less dry gas, thereby tending to maximize liquid yields. As a suitable base point, the atomization of the feed into relatively fine droplets may be selected to match the size and distribution of the solid particles employed in the reaction zone. On the other hand, a larger relative average droplet size and wide distribution, including a portion of droplets significantly larger in size than average, and a spray pattern not well dispersed, can result in a significant increase in coke formation. Subtle changes in atomization therefore can be used to change the coke yield, thereby changing the carbon balance and temperature. The selected degree of atomization will depend on the process objectives.

The present process is applicable to feeds that are either newtonian or non-newtonian fluids. In general, a VR (vacuum residuum) feed to a hydrocarbon conversion and cracking process behaves as a newtonian fluid. Although high boiling resid feed components and cracked recycle stocks which can be part of the total feed stream sent to the feed injectors may exhibit some non-newtonian characteristics, the assumption that the feed generally behaves as a newtonian fluid is considered reasonable and adequate insofar as equipment design is concerned.

An oil-only feed may be "pressure atomized" and/or sprayed into the reactor. However, in the preferred operating mode, a lower molecular weight media is injected into the oil feed. Suitable media include hydrogen, steam, nitrogen, low molecular weight reactor off-gas, and $C_6$- hydrocarbons. Most preferably, a steam/oil mixture is used as the feed stream to the reactor. In a preferred embodiment, this steam/oil mixture is passed through a variable throat feed injector nozzle. The ratio of steam/oil can be adjusted during operations based on changes in oil feed type and properties. The amount of steam in the mixture influences the density of the mixture and will therefore have an impact on atomization. General commercial practice, suitable with the present process, is to use about 0.50 wt. % steam for light feed types and about 3.0 to 5.0 wt. % steam for heavy, more viscous feed types.

The use of a low molecular weight media in reactor feed injectors helps in the vaporization of the liquid droplets by reducing the oil partial pressure. A simple analogy can be drawn to operation of a vacuum pipestill flash zone. At a fixed pressure and temperature, increasing the steam/oil ratio reduces the oil partial pressure and causes more higher boiling oil components to be vaporized.

In a fluidized hydrocarbon conversion and cracking process, the initial contacting of oil feed with the solid particles and how this contacting is carried out influences the reactor product yields and qualities and the associated endothermic heat of reaction required. Initial contacting can be viewed as a localized zone (control volume) in the reactor system, typically consisting of a steam/oil/solid particle mixture (emulsion). By adjusting the steam/oil ratio and atomization (oil liquid droplet size, droplet size distribution, and/or spray pattern), the reaction pathway can be controlled or influenced in accordance to the present invention. It is desirable to optimize the atomization for a given set of reactor inputs or outputs.

A good indicator or measure of the state of atomization of the feed handled is the pressure drop $\Delta P$ across the nozzle of the feed injector. Alternatively, a parameter related to nozzle pressure drop can be used as a measure of atomization. For example, pressure drop is directly related to nozzle cross-sectional area in the preferred feed injectors of the present invention. The nozzle resistance coefficient, defined below in the examples, is also a good measure of atomization. Data relating nozzle droplet size, droplet size distribution and spray pattern to nozzle resistance coefficient, $\Delta P$, or the like can be obtained experimentally, as detailed below in the examples.

As mentioned earlier, the desired degree of atomization may depend on a variety of process or operating objectives. For example, atomization of the feed into a conversion and cracking zone can be selected to compensate for changing reactor temperature and/or carbon and heat balance as well as product yield and quality.

The degree of atomization may be used as a control variable changing in real time. For example, reactor temperature can be varied by varying the degree of atomization. It is believed that the droplet size and droplet size distribution are important factors in achieving yield and selectivity objectives. The use of variable atomization feed injectors to control yield and selectivity in a fluid catalytic cracking unit (FCCU) is described in filed U.S. patent copending application Ser. No. 485,701 filed Feb. 27, 1990 hereby incorporated by reference. The use of variable atomization feed injectors to control the carbon balance in a FCCU is described in filed U.S. patent copending application Ser. No. 486,046 filed Feb. 27, 1990 hereby incorporated by reference. The use of variable atomization feed injectors to respond to changing feeds and flaws thereof is described in U.S. patent application Ser. No. 486,035 filed Feb. 27, 1990, now abandoned hereby incorporated by reference. The use of variable atomization feed injectors to control yield and selectivity and to respond to changing feeds or feed flows in a fluid hydrocarbon conversion and cracking process is described in concurrently filed U.S. patent application Ser. No. 548,473 filed Jul. 3, 1990, now abandoned, hereby incorporated by reference.

The preferred means of controlling the feed atomization is by monitoring the injector nozzle pressure drop $\Delta P$, for example, by means of a pressure transducer or controller (PdRC), and sending a signal based thereon to an actuator associated with a variable (movable) throat feed injector. Suitably, a PdRC can be operated in a simple single control loop mode holding a target nozzle pressure drop. Alternatively, the PdRC can be combined in a more complex control configuration.

In a simple single control loop mode, a PdRC target pressure drop is set to achieve a desired feed atomization. The unit operator would monitor, in an "open loop" control mode, the effect that various PdRC set points have on the reactor temperature and/or carbon and heat balance. The PdRC set point would be selected based on plant response trends to optimize the feed atomization (including spray pattern, droplet size and droplet size distribution) relative to reactor temperature control objectives. Alternatively, another parameter, such as nozzle flow area, which is related to $\Delta P$, can be employed as a measure of feed atomization. The nozzle coefficient of resistance, "CF" defined in the examples below, is a good measure of feed atomization. Data relating nozzle droplet size, droplet size distribution and spray pattern to nozzle resistance coefficient and $\Delta P$ can be experimentally developed. In a similar fashion, $\Delta P$ can be related to reactor carbon and heat balance shifts for the fluid hydrocarbon conversion and cracking reactor. Preferably, each particular reactor can be tested to empirically develop such relationships and correlations. The control response of each reactor system can be unique because of the actual vendor equipment used to construct it. Process models may also be used to establish these relationships. Example 3 below illustrates a computer control model.

The preferred means of controlling the atomization of the feed is by monitoring the injector nozzle pressure drop $\Delta P$, for example, by means of a pressure transducer and pressure controller (PdRC), and sending a signal based thereon to an actuator associated with a variable atomization means feed injector. The actuator works by moving a shaft over a narrow stroke range. At the distal end of the shaft, an atomization adjustment means, positioned in a hydrocarbon flow section of the feed injector, works by varying the cross-sectional flow area available for flow of the feed into the reaction zone.

An application software package can be developed to assist the PdRC in control of the variable atomization means feed injectors. Each actuator may have a position indicator which can be field calibrated for each injector. To minimize investment, a single PdRC may be installed. Instrument piping manifolds can be provided to allow the PdRC to be coupled with any of the injectors. A more expensive configuration would involve individual PdRC instruments for each variable atomization means feed injector.

Field calibration curves can be constructed for each variable atomization means feed injector to define the relationship between nozzle ΔP and nozzle flow area and nozzle resistance coefficient. Ideally, the same relationship should be determined for each nozzle; however, in actual practice, unit specific piping layout may result in some slight difference among various nozzles. Based on field data, one of the variable atomization means nozzles can be selected as the reference sensing nozzle. The PdRC will monitor the pressure drop of this nozzle and send control movement signals to the application program. Based on the field calibration data for each individual variable atomization means feed injector and the PdRC signal, the application program will send a signal to the individual actuators/positioners to change the nozzle flow area as required. To avoid unnecessary actuator hunting, some dead band provision may be provided. Also, a hierarchy may be provided in the application program so that individual nozzles are stroked in a sequential and specific geometric pattern. Two opposing nozzles may be stroked as a pair.

Application of variable throat feed injectors to an fluidized hydrocarbon conversion and cracking process allows for new control configurations for controlling the process carbon balance, heat balance, and reaction zone temperature and/or heater zone temperature. A direct cascade of reactor temperature (TRC) to the pressure control (PdRC) associated with the feed injector nozzle is possible. The feed injector atomization is adjusted to optimize and control the reaction zone temperature. It is also possible to have a higher level control configuration where reactor TRC, nozzle PdRC and vessel and/or slide valve PdRC are configured to control and optimize reactor temperature in a layered hierarchy.

Traditional control modes, which may be practiced in combination with the teachings herein disclosed, are as follows:
  a. Reactor temperature cascaded to the reactor/heater differential pressure which controls hot (coke) solid particle circulation into the reactor.
  b. Reactor temperature cascaded to the hot solid particle transferline slide valve which controls solid particle circulation.
  c. Reactor temperature cascaded to the cold solid particle transferline slide valve which controls solid particle circulation.
  d. Reactor temperature cascaded to the preheat temperature (furnace coil outlet temperature or COT) which controls feed temperature to the reactor.

It is possible to have the reactor temperature cascaded in a layered hierarchy to nozzle PdRC and another controller. A preferred approach would be to have reactor temperature cascaded in a layered hierarchy to nozzle PdRC and to transferline slide valve differential pressure. Such a layered hierarchy would be structured such that suspended solid particle circulation (controlled by transferline slide valve differential pressure) would only be used for gross/large changes in reactor temperature, for example, a change from 950° to 975° F. These gross changes in set point would probably be the result of a multi-variable constraint controller being used to optimize the reactor operation. Small changes in reactor temperature could be achieved by subtle feed atomization changes achieved by a nozzle differential pressure controller and an application package. From a process dynamic perspective, such control should provide more precise reactor temperature control.

Alternatively, fluidized solid particle circulation and preheat can be fixed and changes in the atomization of the feed, that is, changes in the liquid droplet size and/or the size distributions of the liquid droplets and/or spray pattern can be used to influence the reactions in the endothermic reaction system of the fluid hydrocarbon conversion and cracking process. The reactor yields influence the amount of heat needed for the conversion and cracking reactions to occur. For a fixed heat input from the circulating solid particles and feed preheat, and with a target reactor temperature to maintain gross yield objectives, it is viable to change the feed atomization in subtle amounts to control reactor temperature and to compensate for process variations in feed quality and/or solid particle quality.

A process control scheme may involve a single level or stage of feed injectors, or multiple levels (multistage) feed injectors, for example, uniformly distributed around the circumference of an reactor vessel and/or riser. For a typical reactor configuration, the total feed, comprising preheated fresh feed plus cracked recycle stocks from a downstream product fractionator, is typically combined upstream of the feed injector nozzles. This total feed stream is typically combined with feed injection steam and sent to the feed injector nozzles.

Because of existing commercial unit layouts, it may be prohibitively expensive to add additional feed injector nozzles of the variable type employed in the present invention to some of the existing levels of feed injectors, since there may be a number of potential structural interference problems associated with some of these levels of feed injectors in an existing unit. In such a case, additional levels of variable throat feed injectors, according to the present invention, may be provided.

It is not uncommon to practice staged and/or segregated contacting of feeds to an reactor. For example, a fluid coker reactor having several levels of feed injectors has the capability to practice segregated feed contacting. As an example of various embodiments to which the present process is applicable, a particular reactor, for example having levels Nos. 1, 2, and 3 on a vertical axis of its reactor vessel and/or riser, may have the following processing options:
  a. Total feed to level No. 1 (Total feed can be comprised of any or all of the following: virgin or processed or pretreated vacuum residuum, imported vacuum residuum, imported atmospheric resid, recycle streams from the reactor product fractionator, or recycled streams from other refinery process units).

b. Virgin or processed or pretreated vacuum residuum (VR) to level No. 1 and reactor product recycle streams to level No. 2.

c. Total feed to level No. 2 (reduced reactor residence time mode).

d. Virgin or processed or pretreated vacuum residuum (VR) to level No. 1, HKCO (heavy coker cycle oil) recycle to level No. 2, and bottoms product recycle to level No. 3.

e. Virgin or processed or pretreated vacuum residuum (VR) to level No. 2 and reactor product recycle streams to level No. 3.

f. Virgin or processed or pretreated vacuum residuum (VR) feed and reactor recycle streams to level No. 1 and imported (resid) feed to level No. 2.

g. Virgin or processed or pretreated vacuum residuum (VR) to level No. 1 and reactor recycle streams plus imported (resid) feed to level No. 2.

h. Virgin or processed or pretreated vacuum residuum (VR) to level No. 1, reactor recycle streams to level No. 2 and imported (resid) feed to level No. 3.

i. Virgin or processed or pretreated vacuum residuum (VR) and recycle streams to level No. 2 and imported (resid) feed to level No. 3.

In one embodiment of a staged/segregated reactor system, the best quality feed is reacted with the best quality, most active solid particles first. In subsequent stages, preferably lower quality feeds are introduced into the reactor system.

In a single stage transferline reaction system, the preferred location of a level or ring of variable throat feed injector nozzles is at the inlet to the reactor riser (sometimes also called the transferline reactor). Suitably, a number of nozzles are uniformly distributed around the perimeter of the reactor riser to insure good solid particle/oil contacting and mixing.

In a multistage reactor system, wherein an existing unit is revamped in order to practice the present process, a preferred operating mode is as follows. Reactor fresh feed and reactor product recycle streams would be segregated. Because of the fluid property and chemistry differences between recycle streams and fresh feed streams, use of variable atomization means feed injectors on the recycle streams provides additional process flexibility. Recycle stream liquid droplet size, droplet size distribution and/or spray pattern can be optimized by variable atomization means feed injector nozzles. Because of feed segregation, the recycle streams can be atomized into the reactor system at the conditions that are the most optimal for these feed components. It is feasible that the atomization of fresh feed will be optimized at a different state of atomization compared to the atomization of the reactor product recycle streams into the reactor, because of the different hydrocarbon chemistries involved. The basis for these different optimizations will be unit specific based on operating objectives and prevailing economics.

As an alternative case, segregated feeds can be processed at a given level of feed injectors using separate nozzles.

Variable atomization means feed injectors which may be employed in the present invention can be constructed by appropriate modification of a conventional fixed throat injector, for example, by adding a movable throat insert as detailed below. Types of fixed throat nozzle designs are numerous and include, but not limited to, converging-diverging, converging, converging-diverging fan, and spiral type. Extension of this invention to other nozzle geometries and other fixed throat nozzle designs will be appreciated by those skilled in the art. Any feed injector system which is capable of varying the feed atomization in a controllable manner can be employed in the process of the present invention.

Having thus described the invention in general terms, reference is now made to FIG. 1 which illustrates a typical fluid coking with gasification system. Application of the subject invention is not limited to this type of system and is equally applicable to other types of fluidized hydrocarbon conversion and cracking systems and to other zone configurations and positions. Various conventional items such as valves, pumps, compressors, steam lines, instrumentation and other process equipment and control means have been omitted from the figures for the sake of simplicity. Variations obvious to those having ordinary skill in the art of hydrocarbon cracking, fluid coking, fluid coking with gasification and other oil and synthetic fuel fluidized hydrocarbon conversion and cracking processes are included within the broad scope of the present invention.

Referring now to FIG. 1, there is shown a vertically arranged cylindrical reactor 1 containing a reaction zone 1A comprising a fluidized bed of solid coke ore particles, in which bed a hydrocarbon feedstock introduced at lines 2–8 is undergoing conversion and cracking. Hydrocarbon feedstocks that can be suitably employed in a fluid coking with gasification process include heavy hydrocarbonaceous oils; heavy and reduced petroleum crude oils; petroleum atmospheric distillation bottoms, petroleum vacuum distillation bottoms; pitch; asphalt, bitumens, and other heavy hydrocarbon residues; tar-sand oils; shale oils; liquid products derived from coal liquification processes, including coal liquification bottoms, coal; coal slurries and mixtures thereof; and the like. Such feedstocks may be employed singly, separately in parallel reaction zones, or in any desired combination. Hydrocarbon gas and vapors passing through the reaction zone 1A maintain the solid particles in a turbulent fluidized condition having the appearance of a boiling liquid.

In general, any commercial hydrocarbon conversion catalyst of a suitable powder form, designed for high thermal stability could be suitably employed in the present invention as an enhancement to the fundamental in situ developed solid coke ore particles which form the basis of the process of fluid coking, or fluid coking with gasification. Such catalysts include those containing silica and/or alumina such as well known zeolites, as well as others.

In reaction zone 1A, the solid particles becomes spent during contact with the hydrocarbon feedstock due to the deposition of new coke from feed. Thus, the terms "spent" or "coke-contaminated" solid particles as used herein generally refers to solid particles and/or catalyst particles which have passed through a reaction zone and which contains a sufficient quantity of new coke from feed thereon to cause significant activity loss, thereby requiring the removal of coke burn off and/or gasification to restore the process efficiency and performance of the solid particles. Typically, the incremental coke content of the spent solid particles which must be burned off or gasified varies from about 0.50 to about 25.0 wt. %. The regenerator heater and gasifier maintains the size and activity of the seed coke or ore by removing this incremental feed derived coke which is relatively inactive.

Prior to actual regeneration by either burn-off or gasification, the spent solid particles are usually passed from the reaction zone into a stripping zone 1B, below a fluidized bed level indicated at L, and contacted therein with a stripping gas, which is introduced into the lower portion of zone 1B via line 9A and 9B. The stripping gas, which is usually introduced at a pressure of from about 10 to about 150 psig, serves to remove most of the volatile hydrocarbons from the spent solid particles. A preferred stripping gas is steam, although nitrogen, other inert gases or flue gas may be employed. Normally, the stripping zone is maintained at essentially the same temperature as the reaction zone, i.e., from about 850° F. to about 1100° F.

Stripped spent solid particles from which most of the volatile hydrocarbons have been stripped therefrom is then passed from the bottom of stripping zone 1B, through a spent solid particle transfer line, such as J-bend 11 and interconnected vertical riser 11B, which extends into the lower portion of a heater 12.

Riser 11B is shown entering the heater 12 off-center to avoid interference with the heating gas/air mixture from section 27 of the gasifier zone. In the embodiment shown, only one riser 11B is utilized. It is, however, within the contemplation of the subject invention that a plurality of risers may be used.

Air may be added to riser 11B through line 41 in an amount sufficient to reduce the density of the solid particles flowing therein, thus causing the solid particles to flow upward into the heater 12 by simple hydraulic balance.

In the particular configuration shown in FIG. 1, the heater/regenerator 12 is a separate vessel (arranged at approximately the same level as the reactor product scrubber fractionator 16) containing a dense phase fluidized bed 24B of solid particles having a level indicated at L, which is undergoing regeneration to burn off coke deposits formed in the reaction zone during the conversion and cracking reaction, above which is a dilute phase 24B. An oxygen-containing gas enters the lower portion of gasifier regeneration zone 27 via line 29 and passes up through a grid 38 and the dense phase fluidized solid particle bed 27B, maintaining said bed in a turbulent fluidized condition similar to that present in reaction zone 1A. As will be discussed in more detail with respect to FIG. 2 hereinbelow, the present invention resides in an improved system of process control involving the introduction of feed into a conversion and cracking zone which, in this particular design, is located within the coker reaction zone 1A.

Regenerated solid particles from the dense phase fluid bed 24B in the heater/regeneration zone 12 flows downward through standpipe 25 and passes through a J-bend into the reaction zone 1A by way of the transfer line 10 which joins the J-bend at the level of the alternate oil injection line 2A above the J-bend. By regenerated solid particles is meant solid particles leaving the various regeneration, heater and gasification zones which has contacted an oxygen-containing gas causing at least a portion, preferably a substantial portion, of the coke present on the solid particles to be removed, where said coke has been derived from the hydrocarbon feed to the process. The hydrocarbon feedstock for the conversion and cracking process is injected into the reactor 1 through lines 2 to 8 via special feed injectors, to be described in detail below with reference to FIG. 3, to form an oil and solid particle mixture which is passed into the reactor 1 within the reaction zone 1A. Product vapors containing entrained solid particles pass overhead from the reaction zone 1A into a gas-solid separation means 13 wherein the entrained solid particles are separated therefrom and returned through diplegs 14 leading back into the reaction zone 1A. The product vapors, before exiting in lines 17–19, are then conveyed through a scrubber fractionator section 16 into the product recovery system. A liquid draw-off in line 20 provides, in line 22, recycle of coker fractionator bottoms and, in line 21, quench from super-heated vapors.

In regeneration/heater zone 12, gases formed during regeneration/gasification of the spent solid particles can pass from the dense phase fluid bed 24B into the dilute phase 24C along with entrained solid particles. The solid particles are separated from the gas by a suitable gas-solid separation means 32 and returned to the dense phase fluid bed 24B. The substantially solid particle-free gas then passes into a plenum chamber 34 prior to discharge from the regenerator/heater 12 into down stream gas handling equipment through line 60.

It will be readily appreciated by those skilled in the art that the present invention may be applied beneficially to any type of fluid hydrocarbon conversion and cracking process unit with little or no modifications and without limitations as to the spatial arrangement of the various reaction, stripping, and the various regeneration, heating, and gasification zones thereof.

Figure 2A:
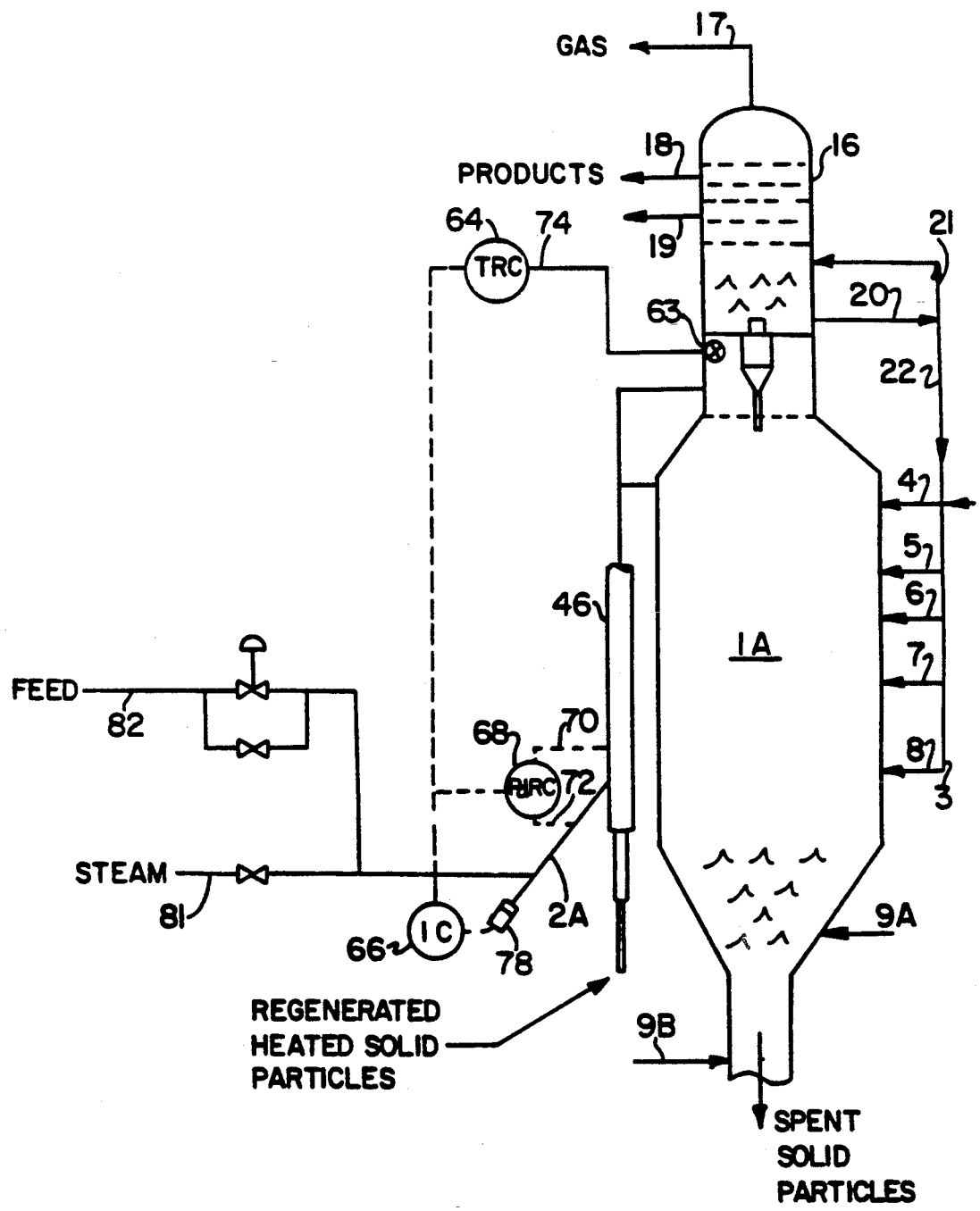
FIG. 2A is a flow diagram of a hydrocarbon conversion and cracking riser reactor comprising a product yield control system according to the present invention.

A better understanding of how the present invention may be applied to control reactor temperature in the fluid coking with gasification unit may be obtained by reference to FIG. 2A, which shows the reaction portion of the fluid coking and gasification unit in isolation from the heater and gasifier portion and in conjunction with certain process control instrumentation and signals. The control system and equipment are in itself conventional, as will be readily appreciated by those skilled in the art and, therefore, are shown only schematically. The numbers in FIG. 2 which are less than or equal to 52 are the same as the numbers in FIG. 1 and correspond to the same parts.

Although schematically showing the alternate feed injectors by a single line 2A in FIG. 2A, this embodiment actually employs a plurality of feed injectors. In three dimensions, there are typically three or more (3 to 20) feed injectors horizontally spaced, on the same level, around a circumference of the riser. For reactor temperature control purposes, a-reactor temperature controller 64 can be cascaded to a feed injector controller 66. Alternatively, the reactor temperature controller 64 can be cascaded to the differential pressure controller 68, which in turn is cascaded to the same feed injector controller 66 to maintain a target level of atomization.

As evident in FIG. 2 and the above detailed description of the invention, the differential pressure controller 68, measures the pressure drop across a portion of the feed injector, suitably the difference between the pressure, as measured by line 70, within the riser 46 just outside the nozzle tip of the feed injector, and the pressure, as measured by line 72, at a point within the injector just prior to the nozzle throat section that is varied, as explained below with respect to FIG. 3. The pressure controller includes a comparator for measuring the difference with a target set point, typically 100 to 150 psi.

A temperature measuring device 63, measures in real time the temperature of the gaseous effluent product from the reaction zone 1A, and a signal based thereon is sent via line 74 to the temperature controller 64. As mentioned above, a signal based on the calculated reactor temperature difference from set point can be cascaded either directly to the injector controller 66, or in a layered hierarchy to the differential pressure controller 68, which in turn is cascaded to feed injector controller 66.

In addition, an acoustic measuring device can be employed for the purpose of monitoring the feed atomization. When alternatively or additionally monitoring the properties of the feed, conventional analytical instrumentation can be employed. For example, the API gravity or refractive index may be measured. Feed composition and/or properties may be measured with infrared, ultraviolet, or mass spectroscopy. High pressure liquid chromatography may be employed to separate components of the feed.

The injector controller 66 is used to preferably individually adjust the pressure drop across a plurality of feed injectors. In each case an actuator 78 is employed to vary the position of suitable atomization adjusting means (not shown). In this embodiment, a movable member is employed to vary the cross-sectional flow area of a throat section of the feed injector and, thereby, the pressure drop. Steam via line 81 is introduced into the feed injector for admixture with the feed oil in line 82 to produce a steam-oil mixture in line 80.

Figure 2B:
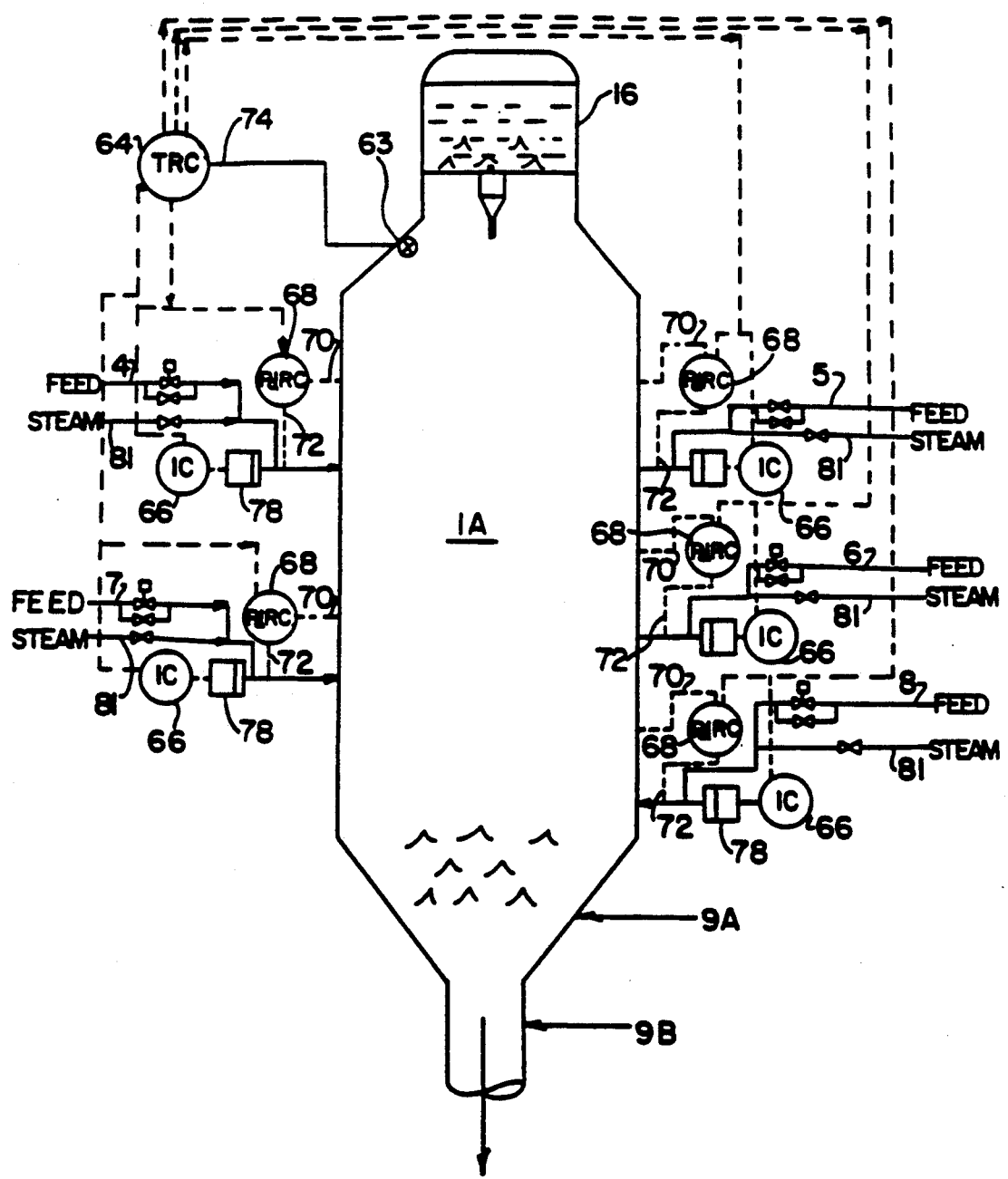
FIG. 2B is a flow diagram of a hydrocarbon conversion and cracking fluid bed reactor comprising a product yield control system according to the present invention.

Additional clarification of how the present invention may be applied to control the reactor temperature from the fluid coking with gasification unit may be obtained by reference to FIG. 2B, which shows the reaction portion of the fluid coking and gasification unit in isolation from the heater and gasifier portion and in conjunction with certain process control instrumentation and signals. The control system and equipment are in itself conventional, as will be readily appreciated by those skilled in the art and, therefore, are shown only schematically. The numbers in FIG. 2B which are less than or equal to 52 are the same as the numbers in FIG. 1 and correspond to the same parts.

Although schematically showing the primary feed injectors at each level by a single lines 4, 5, 6, 7, and 8 in FIG. 2B, this embodiment actually employs a plurality of feed injectors at each level. In three dimensions, there are typically three or more (3 to 20) feed injectors horizontally spaced, on the same level, around a circumference of the coker reactor vessel. For reactor temperature control purposes the controller 64 can be cascaded to a feed injector controller 66. Alternatively, the reactor temperature controller 64 can be cascaded to the pressure controller 68, which in turn is cascaded to the same feed injector controller 66 to maintain a target level of atomization.

As evident in FIG. 2B and the above detailed description of the invention, the pressure controller 68, measures the pressure drop across a portion of the feed injector, suitably the difference between the pressure, as measured by line 70, within the reaction zone 1A, just outside the nozzle tip of the feed injector, and the pressure, as measured by line 72, at a point within the injector just prior to the nozzle throat section that is varied, as explained below with respect to FIG. 3. The pressure controller includes a comparator for measuring the difference with a target set point, typically 100 to 150 psi.

A temperature measuring device 63, measures in real time, the temperature of the components of the gaseous effluent product streams in reaction zone 1A of the reactor outlet, and a signal based thereon is sent via line 74 to a product controller 64. A signal based on the calculated temperature difference from set point can be cascaded either directly to the injector controller 66, or in a layered hierarchy to the pressure controller 68, which in turn is cascaded to feed injector controller 66.

The injector controller 66 is used to preferably individually adjust the pressure drop across the feed injectors. In each case an actuator 78 is employed to vary the position of suitable atomization adjusting means (not shown). In this embodiment, a movable member is employed to vary the cross-sectional flow area of a throat section of the feed injector and, thereby, the pressure drop. Steam via line 81 is introduced into the feed injector for admixture with the feed oil.

Figure 3:
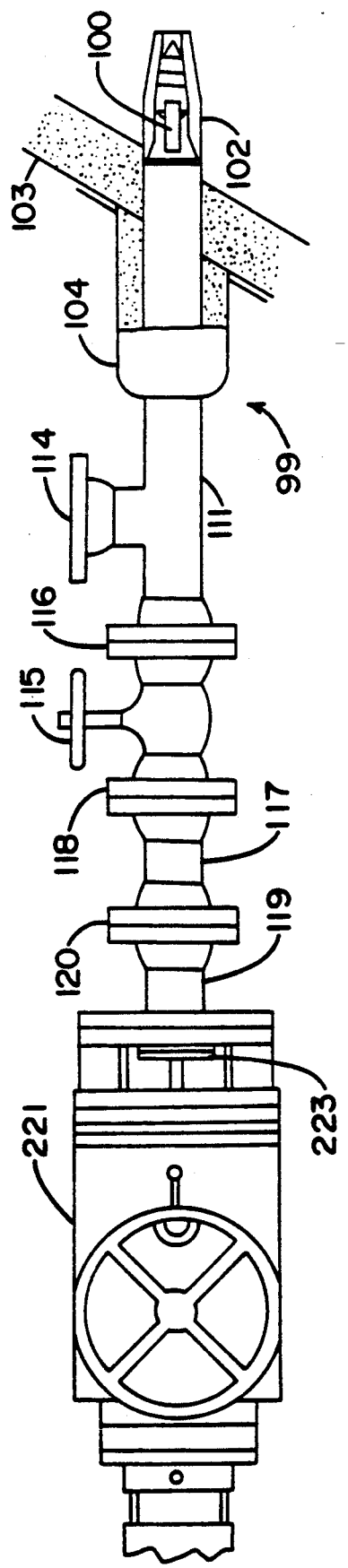
FIG. 3 is a schematic diagram of a variable atomization means reactor feed injector assembly according to one aspect of the present invention.

Referring to FIG. 3, a typical embodiment of an reactor feed injector according to the present invention is shown, generally designated 99. This injector comprises at one end a nozzle tip 102. A fixed throat nozzle geometry is shown, it being understood that various nozzle geometries are quite possible.

The feed injector is connected to wall 103 of the reactor by what is termed a "thermal sleeve" arrangement 104. As evident, the feed injector assembly is an integral part of the reactor system. Other mechanical attachment arrangements will be familiar to those skilled in the art.

Figure 4:
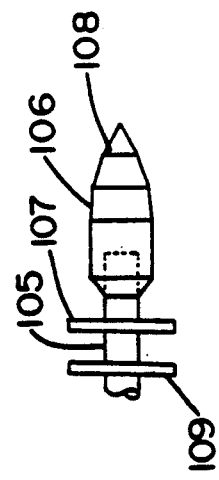
FIG. 4 is a schematic diagram, in greater detail, of the nozzle atomization adjustment assembly portion of the feed injector in FIG. 3.

A feed injector nozzle atomization adjustment assembly, generally designated 100, comprising a shaft 105 and a lead portion or adjusting means 106, is shown in greater detail in FIG. 4. An end tip portion 108 of this adjusting means 106 is designed to function within the converging fan tip nozzle 102. Modulation and/or positioning of the end tip portion 108 within the nozzle tip 102 will change the flow area and influence the atomization achieved by the nozzle tip 102. A preferred addition to the basic design of the variable atomization adjustment means feed injector is to include premixers 107 and 109 in close proximity to the nozzle insert tip 106. The premixers enhance the atomization, particularly the spray pattern, achieved by the variable atomization adjustment means feed injector. The embodiment of a reactor feed injector assembly shown in FIG. 3 represents a minimum stroke design.

Figure 5:
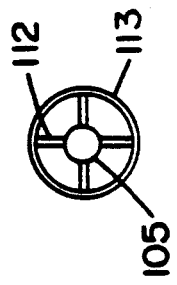
FIG. 5 is a front view of the premixer portion of the nozzle atomization adjustment assembly of FIG. 4.

The two premixers 107 and 109 are staggered on a 45° offset and act as static mixers, slug/bubble breakers, fluid vibration dampeners and radial flow, swirl flow enhancers. From a fluid flow perspective, they impart a radial or swirling moment to the otherwise axial flow. This enhances the atomization achieved by the nozzle. If the flow regime of the fluid in the process pipe leading to the feed injector should happen to fall into an unattractive regime, such as slug flow, the premixers will serve as slug/bubble breakers and help supply a more homogeneous fluid phase mixture immediately upstream of the variable atomization means nozzle. This will also help enhance the atomization achieved by the nozzle. The premixers 107 and 109 also assist in alignment of the shaft 105 and atomization adjusting means 106 within the nozzle 102 and process piping 111. The details of a premixer are shown in cross-section in FIG. 5, wherein it is seen that spokes 112 radially emanate from shaft 105 and join a circular rim 113.

In the particular injector assembly configuration shown in FIG. 3, a mixture of steam and oil is introduced upstream of the nozzle tip 102 through a steam-oil fluid inlet 114. Because of oil partial pressure effects in the reactor, it is generally preferred to use an atomization enhancement medium such as steam to help assist in oil atomization, although other gases could be used. However, the variable throat feed injector could operate with oil-only feed, in a mode to pressure atomize/spray oil without steam being used. The atomization enhancement medium could alternatively be introduced into the reactor through separate connections. However, in a typical operating method for this variable atomization means feed injector, a steam/oil mixture is formed upstream of the nozzle by flow controlling the steam/oil ratio. The steam/oil ratio will be set based on oil properties and other process considerations. The oil phase may be partially vaporized as a result of preheating. Thus, the fluid mixture being supplied to the feed injector assembly will usually consist of a gas phase, a liquid oil phase and possibly a vapor oil phase.

To conserve on system size, an isolation valve 115 between flanges 116 and 118 may be used as part of the feed injector assembly to allow for onstream maintenance of the system. This isolation valve is usually a gate valve, although other valve types such as a ball valve may be used. The atomization adjusting means assembly for the nozzle can be retracted, the isolation valve closed and the assembly removed as required for on-stream maintenance. For example, if feed type and chemistry should cause undesirable coking or partial plugging of the nozzle inside, the nozzle insert shaft assembly can be removed and subjected to onstream cleaning.

A nozzle maintenance receiver pipe section 117, suitably a spool section of piping, is provided between the isolation valve 115 and flange 120. A spool section 119 holding a conventional packing gland allows for modulation of a throat insert employed as an atomization adjusting means. A low leak design is preferred, although various packing gland designs are acceptable. This spool section also allows for on-stream cleaning and maintenance of the nozzle atomization adjustment assembly. It will be appreciated that simplified injector assembly designs are optional, if on-stream maintenance or cleaning is not a concern.

A suitable mechanical positioning means is exemplified by actuator assembly 221, which provides for the mechanical movement, modulation and stroke control of the nozzle atomization adjustment assembly and shaft. Control of the relative position of the nozzle atomization adjustment assembly relative to the nozzle tip 102 influences the atomization and/or spray pattern from the nozzle. In a typical design, a pneumatic actuator with a manual override feature (hand wheel operator) is employed. Other actuator configurations are also acceptable, including a hydraulic actuator or motor-driven actuator. The actuator is capable of receiving control instructions from other instruments and controllers and moving the position of the atomization adjusting means based on these control instructions.

Generally, pneumatic actuators will be preferred over hydraulic actuators because of relative cost, and pneumatic or hydraulic actuators preferred over other types because of reliability. However, unit specific factors may influence actuator selection.

A shaft coupling 223, a bolted flange type, is shown to mate the shaft of the adjustment assembly 100 to the actuator assembly 221. Various shaft coupling designs are acceptable.

Figure 6:
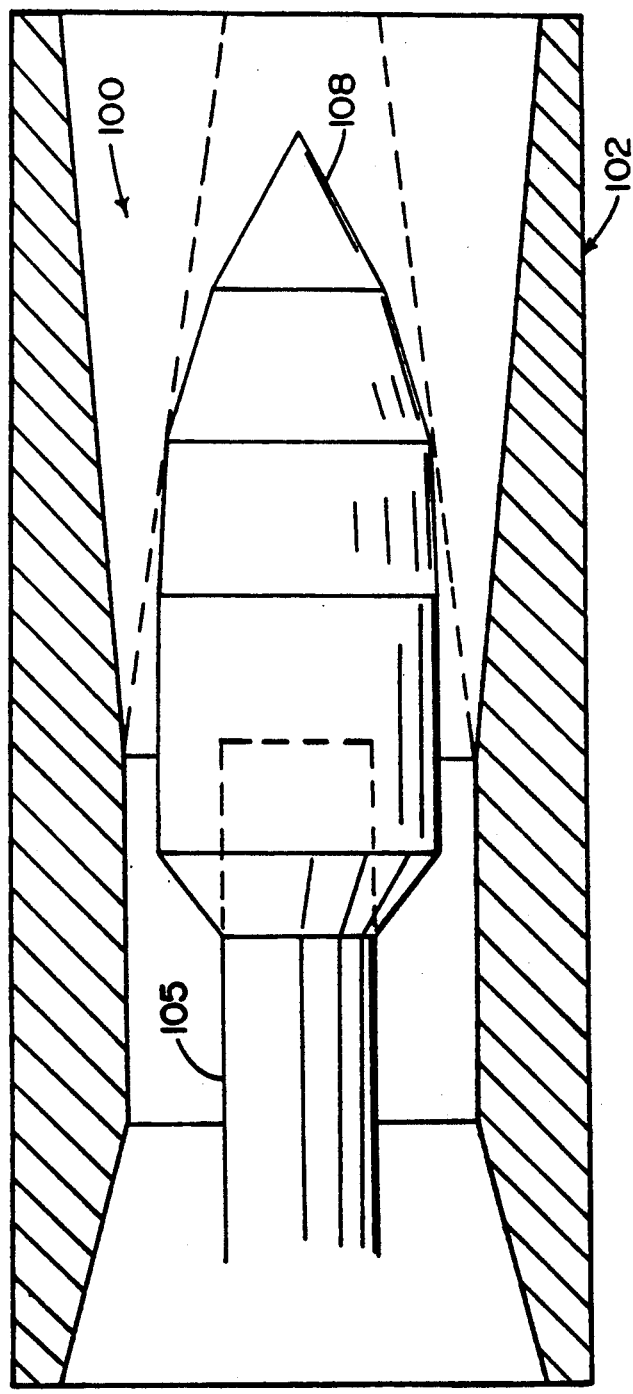
FIG. 6 shows in greater detail a nozzle atomization adjustment assembly while positioned within a variable throat converging fan nozzle geometry; This specific type is used for illustration only.
Figure 7:
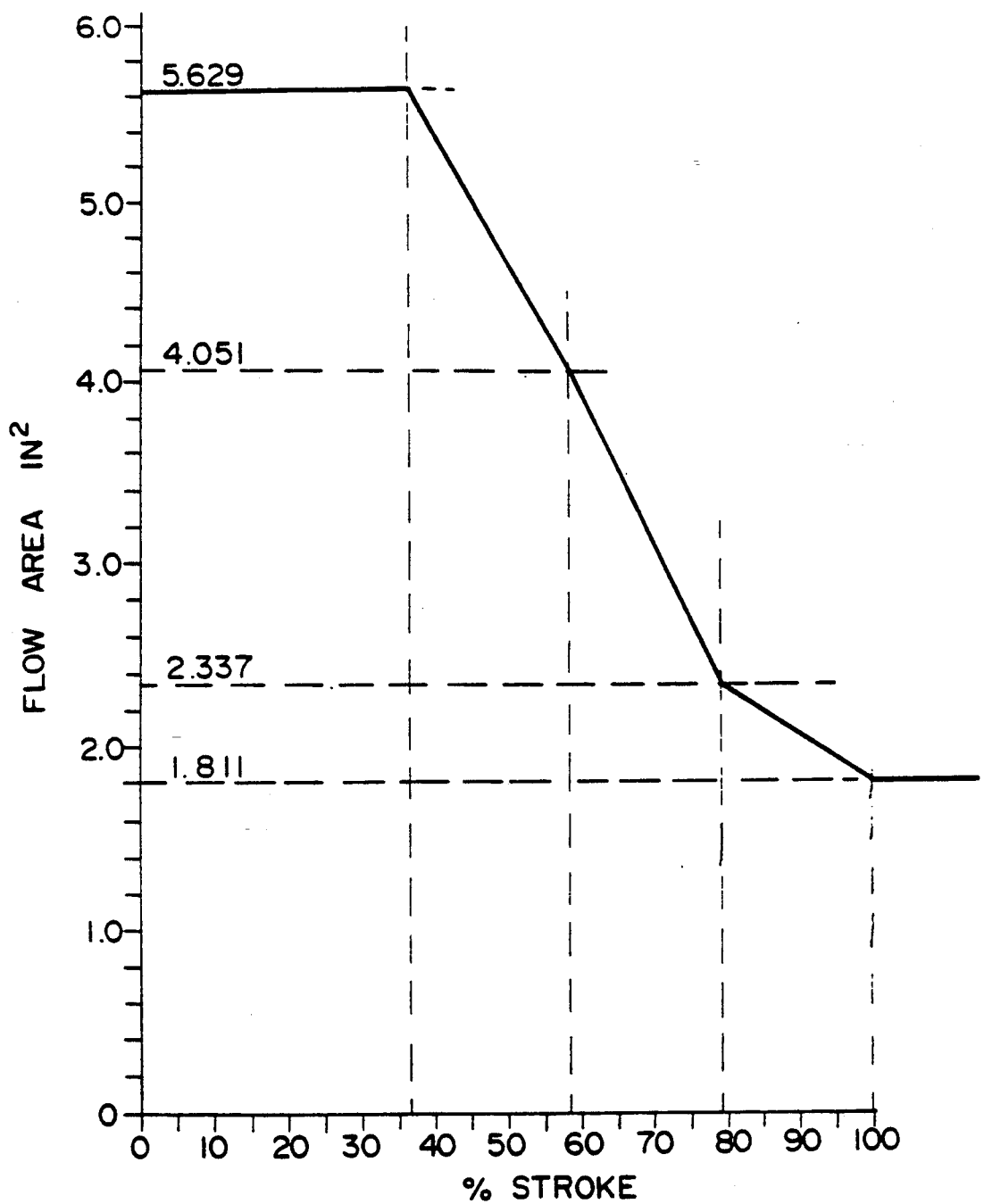
FIG. 7 is a typical graph of percent stroke versus flow area for the nozzle portion of a variable throat converging fan feed injector of the type depicted in FIG. 3.

FIG. 6 shows in greater detail nozzle adjustment assembly 100 (without premixers), positioned at the distal end of shaft 105 and inserted into fan nozzle 102. A tip portion 108 of the nozzle adjustment adjusting means 106 is shown at its estimated maximum insertion point. FIG. 7 shows a graph, for a typical variable atomization means nozzle, wherein the flow area is plotted against the percent stroke of the shaft used to move the nozzle atomization adjustment assembly by its actuator.

Figure 8:
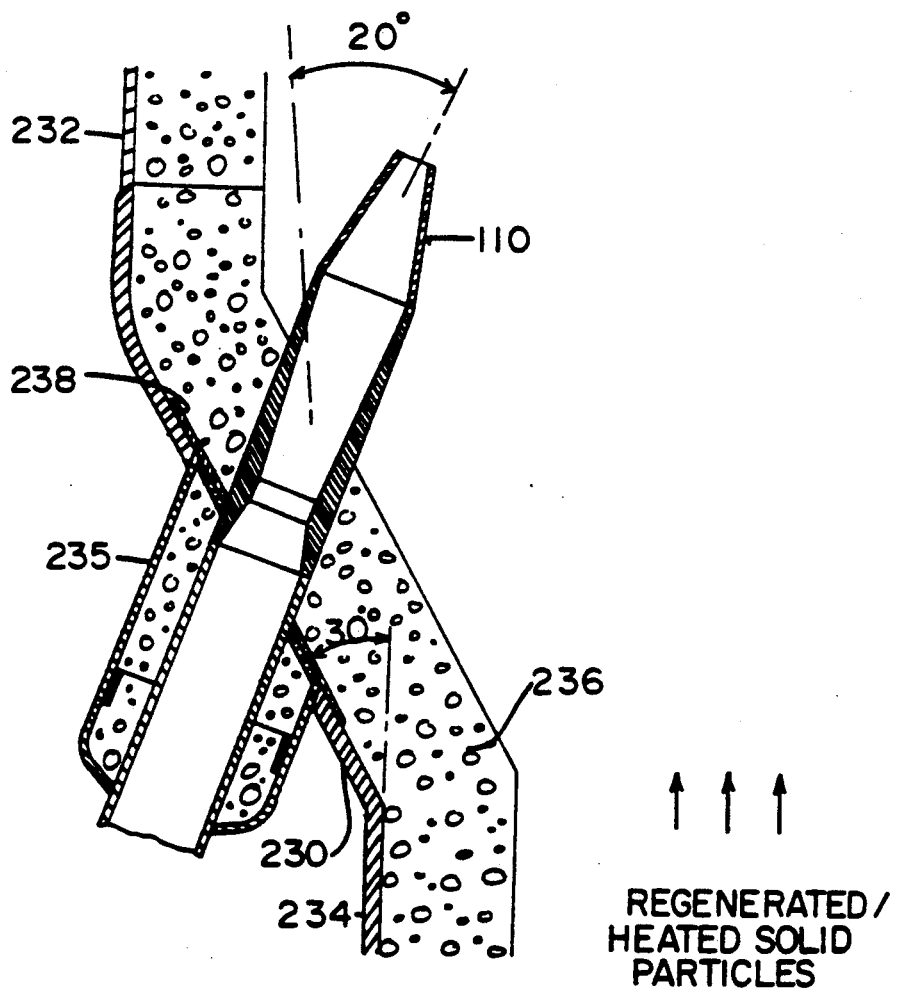
FIG. 8 and 8B are schematic diagrams of the feed injectors depicted in FIG. 2A and FIG. 2B respectively shown attached to a wall of either the riser portion or the reactor fluid bed portion of the hydrocarbon conversion and cracking reactor.
Figure 8B:
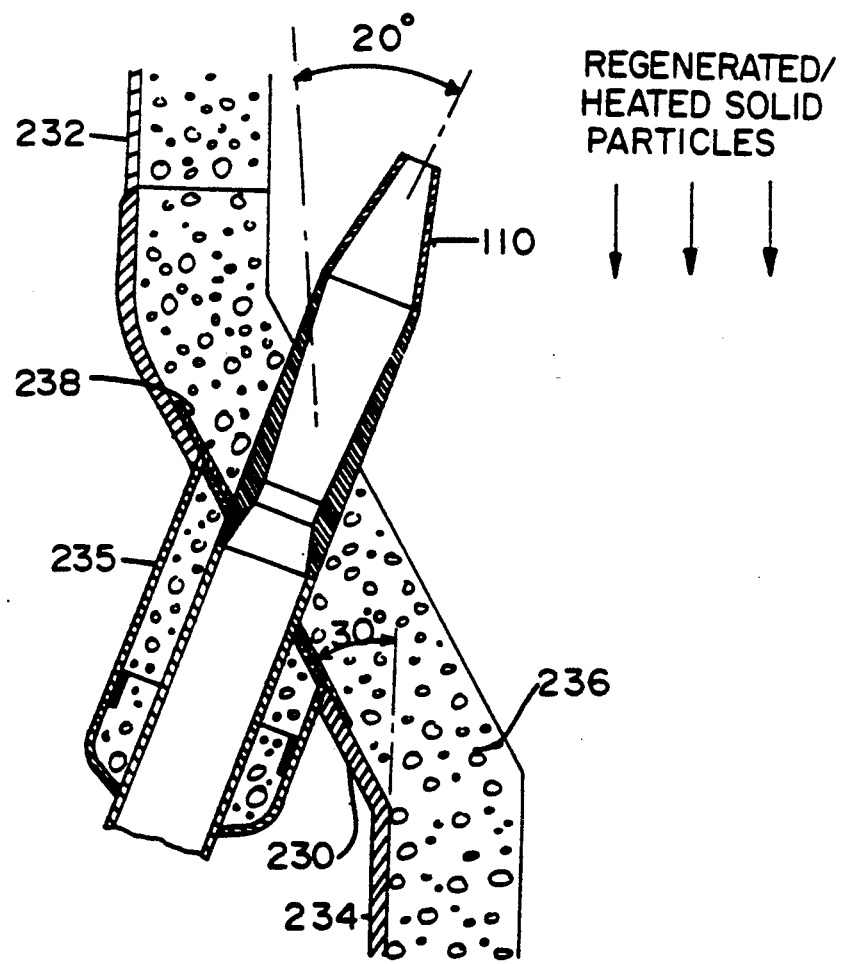

FIG. 8 shows in detail an installation of a typical feed injector attached to the wall of a either a reactor riser or the reactor fluid bed portion of the reator. The nozzle tip portion 110 is shown positioned at a typical angle of 20 degrees to the vertical. The feed injector is shown in cross-section transversing a conical segment shaped wall 230 section which itself is at a 30 degree angle from the vertical, between an upper relatively larger diameter cylindrical vertical wall portion 232 and a lower relatively smaller diameter cylindrical vertical wall portion 234 of the riser. Different attachment angles and orientation angles may be used depending on the specific unit and type of injector. As evident to those skilled in the art, the installation of the injector is conventional and utilizes a pipe cap 235 and castable lining 236 beneath the metal walls of the reactor apparatus. A kaowool pad plate 238 surrounds the circumference of the feed injector where it pierces the riser wall. Welding at appropriate edges renders the connection airtight. Other mechanical attachment arrangements, known to those skilled in the art, are suitable.

EXAMPLE 1

This example illustrates tests for collecting data on atomization associated with various nozzle configurations used for feed injection in a fluid catalytic cracking process. A similar experimental procedure could be used to generate information specific to a fluid coking with gasification process.

Fine droplets and a wide angle spray are expected to provide more rapid and uniform catalyst/oil mixing in the riser and improve the FCCU operation over the existing nozzles. The approach taken in these tests was to conduct cold model tests to examine the effects of liquid viscosity and vapor/liquid flow rates on droplet size, spray dispersion angle, and nozzle pressure drop. Droplet sizes of the sprays were measured with a Laser Doppler Anemometer (LDA). Nitrogen and water/glycerine solutions were used to simulate steam-oil feed. Correlations for predicting the mean droplet size and the pressure drop for a nozzle was developed for use in designing and controlling feed injectors according to the present invention.

Although pressure nozzles, spinning disks and pneumatic nozzles are three basic types of atomizers used in industry, these tests were confined to an investigation of pneumatic nozzles in which a compressible fluid such as air or steam of high velocity is used to disintegrate a liquid jet. The most widely quoted work in pneumatic atomization is a drop-wise correlation by Nukiyama and Tanasawa (Nukiyama and Tanasawa, *Trans. Soc. Mech. Engrg.*, Japan, 6122, 57–58, 1940). This correlation, however, was derived from test data with gas to liquid mass flow ratios on the order of ten compared to the mass flow ratio of about 0.01 used in these tests. For the present conditions, the correlation of Kim and Marshall (K. Y. Kim and W. R. Marshall, Jr., "Drop-size Distribution from Pneumatic Atomizers", *AIChE Journal*, pp.

575–584, Vol. 17, No. 3, May, 1971) is more suitable and therefore was used to compare the test measurements. Kim and Marshall covered the range of gas-liquid relative velocity from 250 ft/sec to sonic velocity, viscosity 1 to 50 cp, and gas-liquid mass ratio 0.06 to 40. The operating ranges of this test program were relative velocity of 200 to 700 ft/sec, viscosity 1.3 to 2.6 cp, and gas-liquid mass ratio from 0.002 to 0.008. These correlations are described below. The above ranges for variables fall within the typical commercial operating conditions for many processes such as FCCU, Fluid Coking, Fluid Coking with Gasification, and others.

Kim and Marshall drop-size correlations for convergent-type pneumatic nozzles were obtained for the following ranges: drop-size, 6 to 350 μm mass medium diameter; mass flow ratio, 0.06 to 40; relative velocity, 250 ft/sec to sonic velocity, and viscosity 1 to 50 cp.

$$\bar{X}_m = 249 \frac{\sigma^{0.41}\mu_1^{0.32}}{(v_{rel}^2 \rho_a)^{0.57} A^{0.36} \rho_1^{0.16}} + 1260 \left(\frac{\mu_1^2}{\rho_1 \sigma}\right)^{0.17} \frac{1}{v_{rel}^{0.54}} \left(\frac{M_a}{M_1}\right)^m$$

where $m = -1$, if $M_a/M_1 < 3$; $m = -0.5$, if $M_a/M_1 > 3$.

$$\bar{X}_{vs} = 0.83 \bar{X}_m$$

where:
$\bar{X}_m$ = Mass medium diameter, μm
$\bar{X}_{vs}$ = sauter mean diameter, μm
$\sigma$ = Surface tension, dynes/μm
$\mu_1$ = Liquid viscosity, cp
$\rho_a, \rho_1$ = Gas and liquid densities, lb/ft$^3$
A = Area, ft$^2$
$v_{rel}$ = Gas to liquid relative velocity, ft/sec
$M_a, M_1$ = Gas to liquid mass flowrates, lbs/min The experimental set-up consisted of a chamber (3 feet square and 6 feet long) equipped with light and viewing windows. The nozzle was mounted at one end of the rig and sprayed in horizontally. A screen at the far end of the rig was used to trap the spray. A liquid feed mixing tank was used to blend glycerine with water to provide the desired viscosity. Still pictures were taken to determine the spray angle and the Laser Doppler Anemometer (LDA) was used to measure drop size.

The LDA technique for sizing spherical droplets is based on the measurement of the relative phase shift that occurs when two light waves pass through the droplets on different paths. By measuring the visibility or amplitude modulation of the interference pattern formed by the scattered light and collected over a finite collecting operation, adequate information to size the droplets can be obtained.

The hardware system comprises the following pieces of equipment: transmitter, receiver, visibility processor, data management system, keyboard, Krohn-hite filter, and Anadex printer. The detailed descriptions of these components are given in "Operation Guide for Droplet Sizing Interferometer," by Spectron Development Laboratories, Inc., SDL No. 82-51025, Costa Mesa, Calif. (1982).

The function of the transmitter is to project two coherent laser beams into a chosen test space where they may be moving droplets. The droplets scatter light from the fringe pattern caused by the crossing beams and the frequency and modulation yield the velocity and size of the measured droplets. In general, it is necessary to perfect the new alignment each time anything is changed, but these adjustments are simple. The "permanent" alignments, which require more care, need only be touched very rarely, if at all.

The transmitter contains a Spectra-Physics Model Number 107 DEM Helium Neon Laser, laser power supply, steering mirrors, a telescopic beam expander, a half wave plate, a beam steering prism, a 50% beam-splitter and interchangeable output optics.

The receiver is essentially a telescope with a photomultiplier to collect light from the focal point, at which there is an interchangeable pinhole. The positioning of the entire assembly is so as to align it approximately with the transmitted probe volume. The receiver collects light that has been scattered from anything within the illuminated sample volume and directs it on to the cathode of the photomultiplier.

The Visibility and Doppler Signed Processor is a microprocessor which produces particle size information from optical data transmitted from the receiver.

Figure 9:
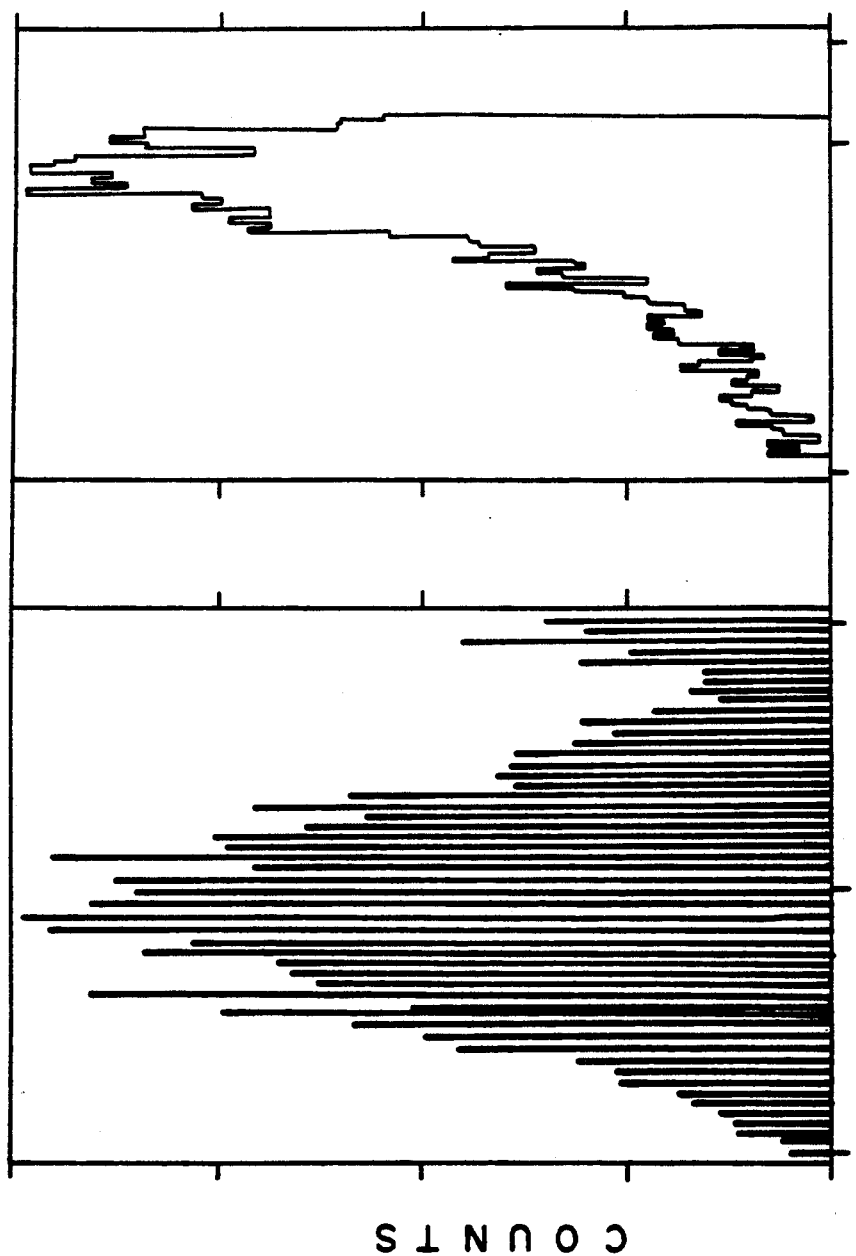
FIG. 9 shows a graph of a typical feed injector droplet size distribution and droplet velocity distribution.

An Apple-II Plus was used to collect and process data. FIG. 9 illustrates a typical droplet size distribution and a droplet velocity distribution. The output also includes linear mean diameter, surface mean diameter, volume mean diameter, sauter mean diameter, and droplet mean velocity.

Three different test nozzles (numbered 1, 2, and 3) were studied, wherein drop size and spray angle associated with each of the three nozzles were measured at various vapor/liquid feed rates. Sauter mean diameter of drops with nozzles nos. 1 and 2 were all greater than 1000 μm (Run 1–6 and 17–21). The drop size measurement with LDA was restricted to 1000 μm or smaller due to the narrow angle of laser beams achievable through the tank windows.

The distribution of drop sizes with nozzle no. 3 appear to be wide and bimodal. A complete first mode and part of the second mode were recorded in the sprays when the liquid flow rate was lowest at 10 gpm as in Runs 11 and 16. The base case liquid rate scaled down from a commercial FCCU is 20 gpm. This indicates that spray drop size can be reduced by lowering the liquid feed rate in the commercial FCCU when using a fan nozzle. Higher liquid viscosity gave larger drops as indicated by the drop size data with 1.3 cp (Runs 7, 8, 11) and 2.6 cp (Runs 12, 13, 16) liquids.

The spray dispersion angles obtained from pictures with nozzle no. 3 were in the range of 80° to 110°, while those with nozzle no. 2 were between 25° and 40°. The spray angles with both nozzles were wider with higher gas/liquid ratios.

The nozzle pressure drop, representing energy consumption, was also compared with the three nozzles. The data, shown in Table 1, indicates that ΔP with the nozzle no. 3 was about 33% lower than with nozzle no. 2 at the same gas/liquid flow rates. The effect of liquid viscosity on ΔP was not noticeable in the narrow viscosity range of 1.3 to 2.6 cp.

Reasonably good results were obtained with the exponent m of the Kim and Marshall correlation was taken to be −0.9 to predict the Sauter Mean Diameter (SMD) of the fan nozzle spray. Such data on various flow rates, fluid properties, and nozzle designs and control responses can be used to develop correlations useful for feed injector design and control responses.

TABLE 1

FCCU Feed Nozzle Test Parameters and Test Results

| Nozzle No. | Gas Flow-rate scfm | Liquid Flow-rate gpm | Liquid Viscosity cp | Vel. @ Throat ft/sec | Nozzle ΔP psi | Spray Angle ° | Sauter Mean Diameter μm |
|---|---|---|---|---|---|---|---|
| 1 | 9.2  | 20 | 1.3 | 100 | 18 | —(4) | 1000+ |
| 1 | 9.2  | 20 | 1.3 | 100 | 18 | —(4) | 1000+ |
| 2 | 18.5 | 20 | 1.3 | 178 | 25 | —(4) | 1000+ |
| 2 | 4.6  | 20 | 1.3 | 62  | 15 | —(4) | 1000+ |
| 2 | 9.2  | 40 | 1.3 | 123 | 51 | —(4) | 1000+ |
| 2 | 9.2  | 10 | 1.3 | 89  | 7  | —(4) | 1000+ |
| 3 | 9.2  | 20 | 1.3 | 100 | 13 | —(4) | 789 |
| 3 | 18.5 | 20 | 1.3 | 178 | 18 | —(4) | 813 |
| 3 | 4.6  | 20 | 1.3 | 62  | 10 | —(4) | 1000+ |
| 3 | 9.2  | 40 | 1.3 | 123 | 36 | —(4) | 1000+ |
| 3 | 9.2  | 10 | 1.3 | 89  | 3  | —(4) | 690 |
| 3 | 9.2  | 20 | 2.6 | 100 | 12 | 80 | 835 |
| 3 | 18.5 | 20 | 2.6 | 178 | 17 | 110 | 857 |
| 3 | 4.6  | 20 | 2.6 | 62  | 10 | 80 | 1000+ |
| 3 | 9.2  | 32 | 2.6 | 114 | 26 | —(4) | 1000+ |
| 3 | 9.2  | 10 | 2.6 | 89  | 3  | 95 | 773 |
| 2 | 9.2  | 20 | 2.6 | 100 | 18 | 35 | 1000+ |
| 2 | 18.5 | 20 | 2.6 | 178 | 25 | 40 | 1000+ |
| 2 | 4.6  | 20 | 2.6 | 62  | 15 | 35 | 1000+ |
| 2 | 9.2  | 38 | 2.6 | 121 | 49 | —(4) | 1000+ |
| 2 | 9.2  | 10 | 2.6 | 89  | 7  | 25 | 1000+ |

EXAMPLE 2

This example illustrates a temperature control scheme for an fluid coking with gasification process unit according to the present invention. Although the description was written for application to a particular fluid coking with gasification unit, application to other fluid hydrocarbon conversion and cracking units will be appreciated by those skilled in the art. The following information in Tables 2, 3, and 4 below are used in the control scheme. (Units of klb/hr, °F., psi, and psig are obtained by calculation. Instrument Tag ID numbers for a particular plant are shown.) Ten feed injectors are assumed to be in service for purposes of illustration in this example. Unit specific conditions would dictate the actual number of feed injectors in service.

TABLE 2

Process Information Available from the Unit Instrumentation

| Instrument ID | Description |
|---|---|
| FC-F2005-IC | Reactor Injection Steam Rate |
| FC-F2004-RC | Reactor Total Feed Rate |
| FC-F2216-IC | Reactor Product (HKCO) Recycle Rate |
| FC-F2224-IC | Bottoms ("Slurry") Recycle Rate |
| FC-F2203-I  | Total Fresh Feed Rate |
| FC-T2214-RC | Total Fresh Feed Temperature |
| FC-T2248-I  | Total Fresh Feed Temperature |
| FC-P2099-dRC (A to J) | Feed Injector Nozzle Pressure Drop |
| FC-Z2099-I (A to J) | Feed Injector Nozzle Insert Position |
| FC-P2005-dR | Reactor Riser Differential Pressure |
| FC-P2001-R  | Reactor Top Pressure |
| FC-P2002-dRC | Reactor/Heater Differential Pressure |
| FC-H2004-IC | Throttling Hot Coke Slide Valve Position |
| FC-P2010-dRC | Throttling Hot Coke Slide Valve Differential Pressure |
| FC-T2001-RC | Reactor Temperature |
| FC-F | |

TABLE 3

Process Information Calculated by the Control Computer

| PMX Variable ID | Definition | Calculation |
|---|---|---|
| FC-X2000 | Total Recycle to Total Feed Ratio | (F2216 + F2224)/F2004 |
| FC-X2001 | "Slurry" Recycle to Total Feed Ratio | F2224/F2004 |
| FC-X2002 | HKCO Recycle to Total Feed Ratio | F2216/F2004 |
| FC-X2003 | Fresh Feed to Total Feed Ratio | F2203/F2004 |
| FC-X2004 | Total Mass Flow Rate | F2005 + F2203 + F2216 + F2224 |
| FC-X2005 | Est. Nozzle Outlet Pressure | P2005 + P2001 + 14.7 |
| FC-X2006 | Est. Nozzle Inlet Pressure | X2005 + P2099avg |
| FC-P2099avg | Average Nozzle Pressure Drop | (P2099A + P2099B + P2099C + P2099D + P2099E + P2099F + P2099G + P2099H + P2099I + P2099J)/10 |
| FC-X2007 | Nozzle Pressure Ratio | X2006/X2005 |
| FC-X2008 | Average Feed Temperature | (T2214 + T2248)/2 |
| FC-XVAPRF | Estimated Vapor Fraction | (XKFF/11.6) * (0.01 + (0.08/300) * (X2008 − 400)), a GSK-specific estimate |
| FC-X2009 | Estimated HC Vapor Rate | XVAPFR * F2203 |
| FC-X2010 | Estimated Steam Density | (((X2006 + X2005)/2) * 18)/(10.73 * (X2008 + 460)), lb/cf |
| FC-X2011 | Estimated HC Vapor Density | (((X2006 + X2005)/2) * 300 * (11.6/XKFF))/(10.73 * 0.95 * (X2008 + 460)), lb/cf |
| FC-X2012 | Estimated Fresh Feed Density | 62.4 * XFFSG, lb/cf |
| FC-X2013 | Estimated HKCO Density | 62.4 * XHRSG, lb/cf |
| FC-X2014 | Estimated Bottoms Density | 62.4 * XBRSG, lb/cf |
| FC-X2015 | Steam Volume | F2005/X2010 |
| FC-X2016 | HC Vapor Volume | X2009/X2011 |
| FC-X2017 | FF Liquid Volume | (F2203 − X2009)/X2012 |
| FC-2018 | HKCO Volume | F2216/X2013 |
| FC-X2019 | Bottoms Volume | F2224/X2014 |
| FC-X2020 | Total Volume | X2015 + X2016 + X2017 + X2018 + X2019 |
| FC-X2021 | Two Phase Mixture Density | (X2015/X2020) * X2010 + (X2016/X2020) * X2011 + (X2017/X2020) * X2012 + (X2018/X2020) * X2013 + ((X2019/X2020) * X2014, lb/cf |
| FC-X2022 | Vapor Phase Density | (X2015/X2020) * X2010 + (X2016/X2020) * X2011, lb/cf |
| FC-X2023 | "y" | (X2009 + F2005)/X2004 |
| FC-X2024 | "B" | X2023 ** −0.49 |
| FC-X2025 | Sonic Velocity | 68 * (X2024/X2021) * ((XCPCV * ((X2005 + X2006)/2) * X2022)**0.5) |
| FC-X2026 | Throat Average Velocity | X2020/(3600 * XTONAREA) |

The variable XTONAREA is the total nozzle flow area, sq. ft. Individual position of the nozzle insert in each nozzle will allow the flow area in the throat to be calculated for the nozzle geometry. The total flow area available is then calculated based on the number of active nozzles in service.

The throat velocity is compared to the sonic velocity. If the throat velocity is greater than 65% of the sonic velocity, then the sonic flow pressure drop equation is used to calculate a flow coefficient ("CF"). If the throat velocity is less than 65% of sonic, the sub-sonic flow equation is used to calculate a flow coefficient. Sub-sonic "CF" is defined as follows:

$$CF = ((A_o * 2 * X2021 * X2026 * X2026)/P2099avg)^{**} 0.5$$

Sonic "CF" is defined as follows:

$$CF = ((B_o * 2 * X2021 * X2026 * X2025)/P2099avg)^{**} 0.5$$

where $A_o$ and $B_o$ are constants which must be determined empirically for each particular nozzle design.

TABLE 4

Run Plan Specific Information
(Supplied by the unit operator)

| "PMX" Variable ID | Description |
|---|---|
| FC-XKFF | Fresh Feed Characteristic Factor |
| FC-XFFSG | Fresh Feed Specific Gravity |
| FC-XHRSG | HKCO Recycle Specific Gravity |
| FC-XBRSG | Bottoms Recycle Specific Gravity |

A reactor temperature control operating mode will now be described, using the information provided above. A process controller, designated T-2001RC, will reset individual feed injector nozzle controllers to open or close the available flow area to allow more or less total feed to pass into the reactor. The flow coefficient parameter "CF" will be monitored in a fashion to ensure that a good atomization region is being maintained for the majority of the feed injectors. Selected injectors will be manipulated by T-2001RC to influence the process carbon and heat balance and maintain a desired reactor temperature as process conditions change. The primary parameter being controlled in this control scheme is the reactor coke yield and the heat required by the reaction system for the conversion and cracking reactions. The control computer calculated flow coefficient is used as an index to manipulate the process carbon and heat balance, to achieve the target reactor temperature.

Because of potential adverse yield effects, the control of the reactor temperature is broken into two parts: a gross control and a fine tuning/precision control. For the gross control of reactor temperature, when large rampings in target reactor temperature are being called for, either the circulation rate of solid particles and/or the reactor feed preheat temperature will be manipulated. On a typical Flexicoking unit, the throttling slide valve can be manipulated to control reactor temperature. In the control scheme envisioned, when large deviations from target reactor temperature set point are observed(approximately greater than ±3° F.), then the classical technique for controlling reactor temperature indicated above would be used. For minor deviations in reactor temperature(approximately less than ±3° F.), then the feed injector atomization would be manipulated to control reactor temperature. This allows real time compensation for changes which may occur in other process parameters.

The process feed injector pressure drop reading is a gross indication of feed injector atomization. (at a constant flow rate through the injectors), but many process factors can and will influence this reading. By applying the sub-sonic and sonic feed injector pressure drop equations to calculate a flow coefficient,"CF", a more representative indication of feed atomization is obtained. This allows flexibility for more intelligent control decisions and hierarchy to be applied to the fluid coking with gasification process to achieve target operating objectives. Also, control of the feed injector atomization can achieve a much more precise control compared to throttling large solid particle flows through a slide valve or manipulation of feed preheat duty.

For a multiple nozzle feed injector configuration, manipulating only a portion of the nozzles will provide adequate reactor temperature control. The remaining nozzles would be controlled based on the nozzle P-2099dRC cascade to the nozzle actuator, H-2099-IC. The set point for these PdRCs will be based on run plan specific process objectives consistent with the product yield or quality objectives under control. It is also possible that these remaining nozzles could be incorporated in this yield or quality control in a layered hierarchy. The nozzle flow coefficient, "CF",would be used as a gauge of the current operating band relative to the control objectives. If the "CF", of the portion of the nozzles being manipulated is driven too far from a specific target, then the entire group of feed injector nozzles would be re-positioned to a new "CF" level.

For the operating scenario envisioned, roughly 20% of the reactor total feed rate is manipulated by about 20% of the total number of reactor feed injector nozzles. This percentage of the reactor feed should provide sufficient response to the reaction system carbon balance and reaction system heat load requirement to allow for very precise control of the reactor temperature as indicated by T-2001RC. The remaining 80% of the total reactor feed and 80% of the nozzles are held and controlled to an operating region and then manipulated in either an "open loop" or layered hierarchy to achieve the process objectives. The unit specific process objectives will influence the 20%/80% split cited above and this split may be varied in the range from 0% to 100% depending on the individual unit operating objectives.

To minimize process disturbances, the 20% of the total number of feed injector nozzles used in this example may be ramped open or closed by moving opposing pairs of nozzles as a unit. (The pairings would typically be as follows: A/F, B/G, C/H, D/I, and E/J for a reactor system with a total of ten feed injector nozzles). In the stroke range from 36% to 80% each pair of injectors would be moved a maximum of about 10% stroke at a time in response to feed rate changes. This 10% increment corresponds to about 2.7% of the total nozzle throat area being manipulated at one time. Table 5 below illustrates a typical sequential flow area change using this technique:

TABLE 5

| Nozzle ID | Start Stroke, % | Start Throat Area | First Step Stroke, % | First Step Throat Area |
|---|---|---|---|---|
| A | 36 | 5.629 | 46 | 4.859 |
| F | 36 | 5.629 | 46 | 4.859 |

TABLE 5-continued

| | | | | |
|---|---|---|---|---|
| B | 36 | 5.629 | 36 | 5.629 |
| G | 36 | 5.629 | 36 | 5.629 |
| C | 36 | 5.629 | 36 | 5.629 |
| H | 36 | 5.629 | 36 | 5.629 |
| D | 36 | 5.629 | 36 | 5.629 |
| I | 36 | 5.629 | 36 | 5.629 |
| E | 36 | 5.629 | 36 | 5.629 |
| J | 36 | 5.629 | 36 | 5.629 |
| Total Throat Area = | | 56.29 | | 54.75 |

| Nozzle ID | Second Step | | Third Step | |
|---|---|---|---|---|
| | Stroke, % | Throat Area | Stroke, % | Throat Area |
| A | 46 | 4.859 | 46 | 4.859 |
| F | 46 | 4.859 | 46 | 4.859 |
| B | 46 | 4.859 | 46 | 4.859 |
| G | 46 | 4.859 | 46 | 4.859 |
| C | 36 | 5.629 | 46 | 4.859 |
| H | 36 | 5.629 | 46 | 4.859 |
| D | 36 | 5.629 | 36 | 5.629 |
| I | 36 | 5.629 | 36 | 5.629 |
| E | 36 | 5.629 | 36 | 5.629 |
| J | 36 | 5.629 | 36 | 5.629 |
| Total Throat Area = | | 53.21 | | 51.67 |

Table 5 above illustrates how a very precise flow area control can be maintained and manipulated to achieve the desired level of feed atomization. The above case is an illustration of a controlled ramping closed of the feed injectors, caused by a change/deviation in T-2001RC from its set point. To ramp open the feed injector flow area a reverse sequence would be used.

The control computer application program could be constructed in several different forms. The reactor temperature controller, T-2001RC, could be cascaded directly to the feed injector actuators, H-2099-IC (A to J), or in a layered hierarchy with F-2004-RC cascaded to P-2099-dRC (A to J) which in turn could be cascaded to the individual feed injector actuators, H-2099-IC (A to J). Having individual actuator controllers and PdRC instrumentation on each feed injector provides flexibility for on stream maintenance and control loop tuning of the feed injector system. Lower cost configurations are possible with fewer instruments, and would represent a simplified version of the configuration detailed above.

Figure 10A:
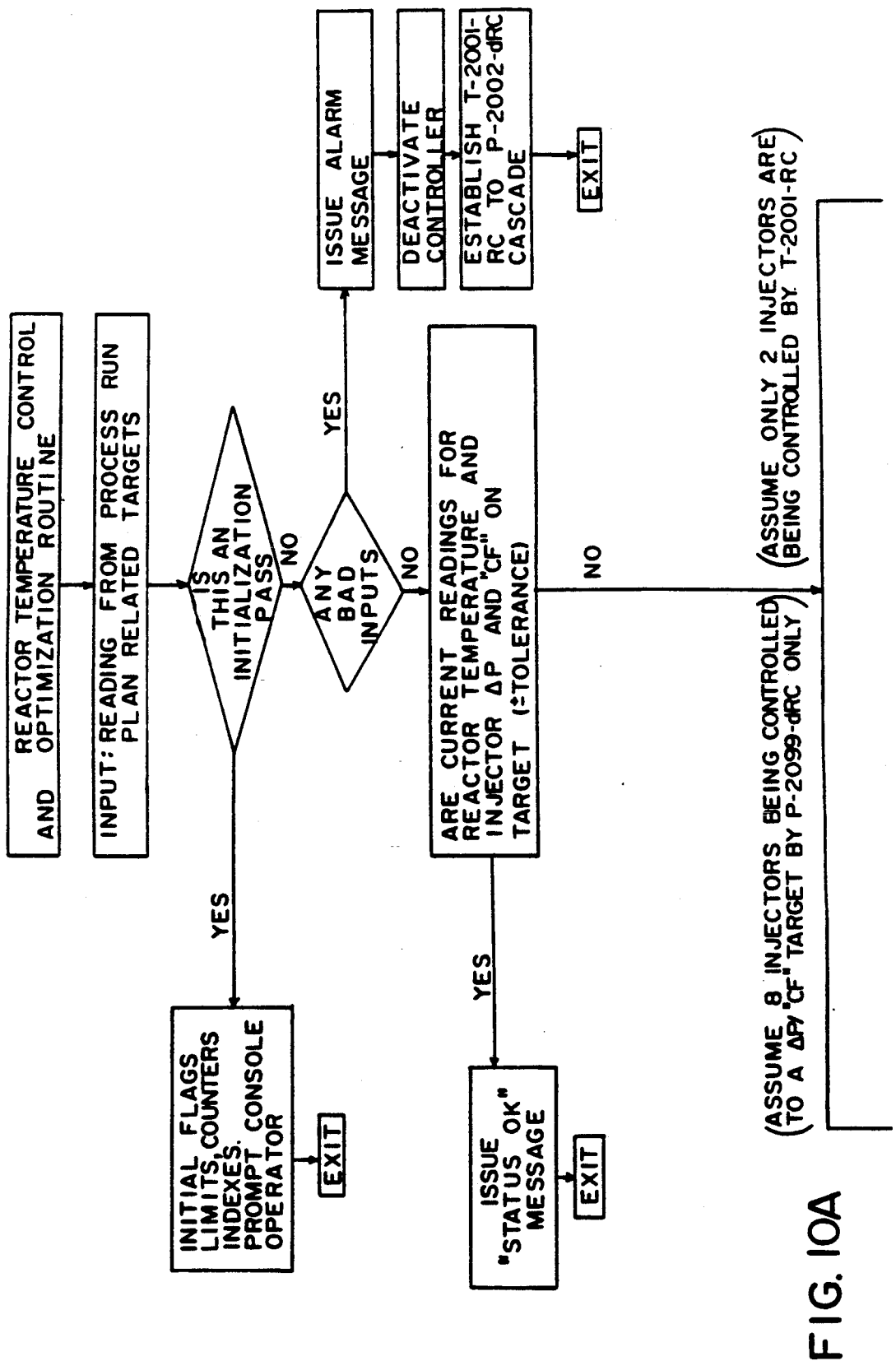
FIG. 10 (parts A and B) is a flow chart illustrating a computer application program for carrying out a preferred embodiment of the invention according to Example 2 below.
Figure 10B:
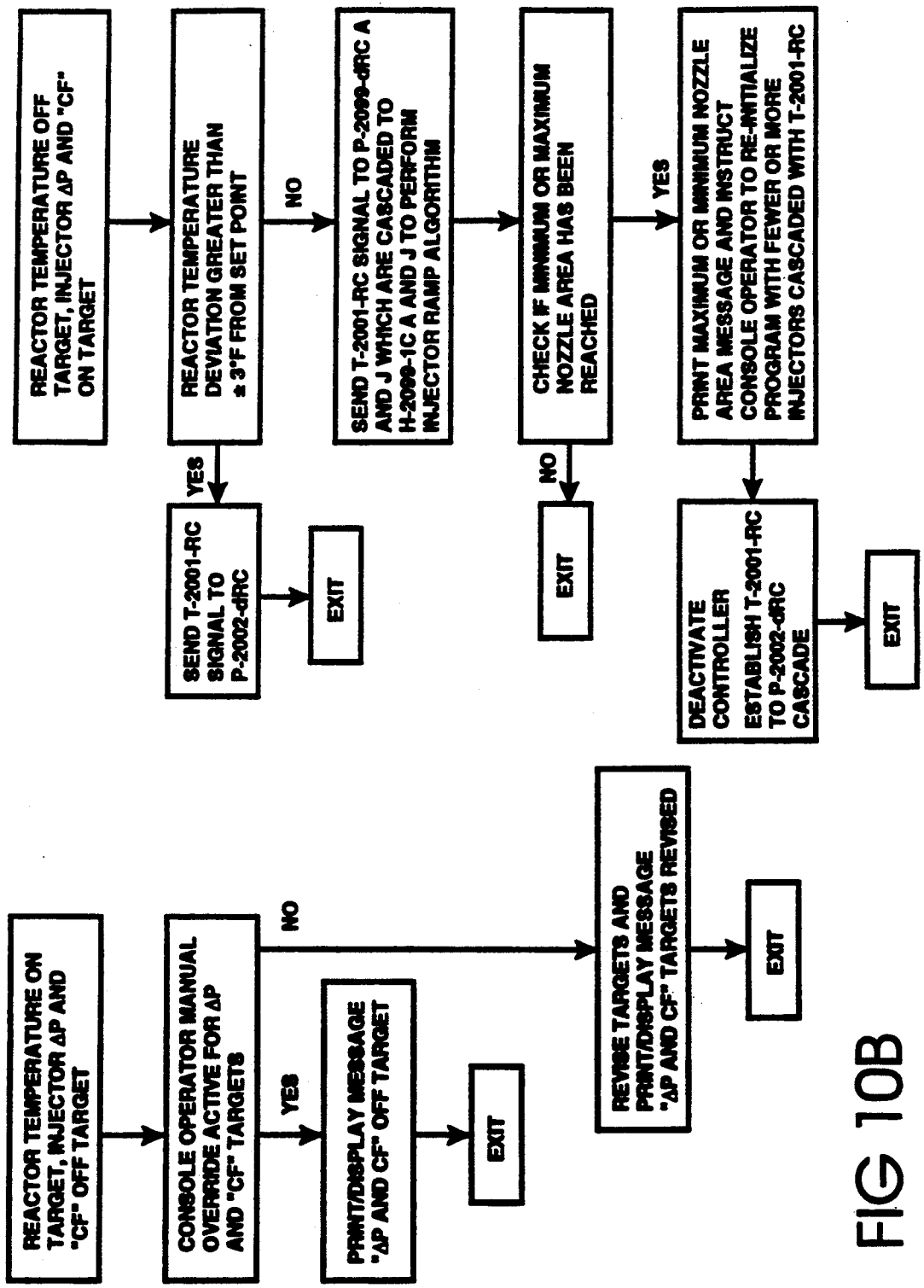
Figure 11A:
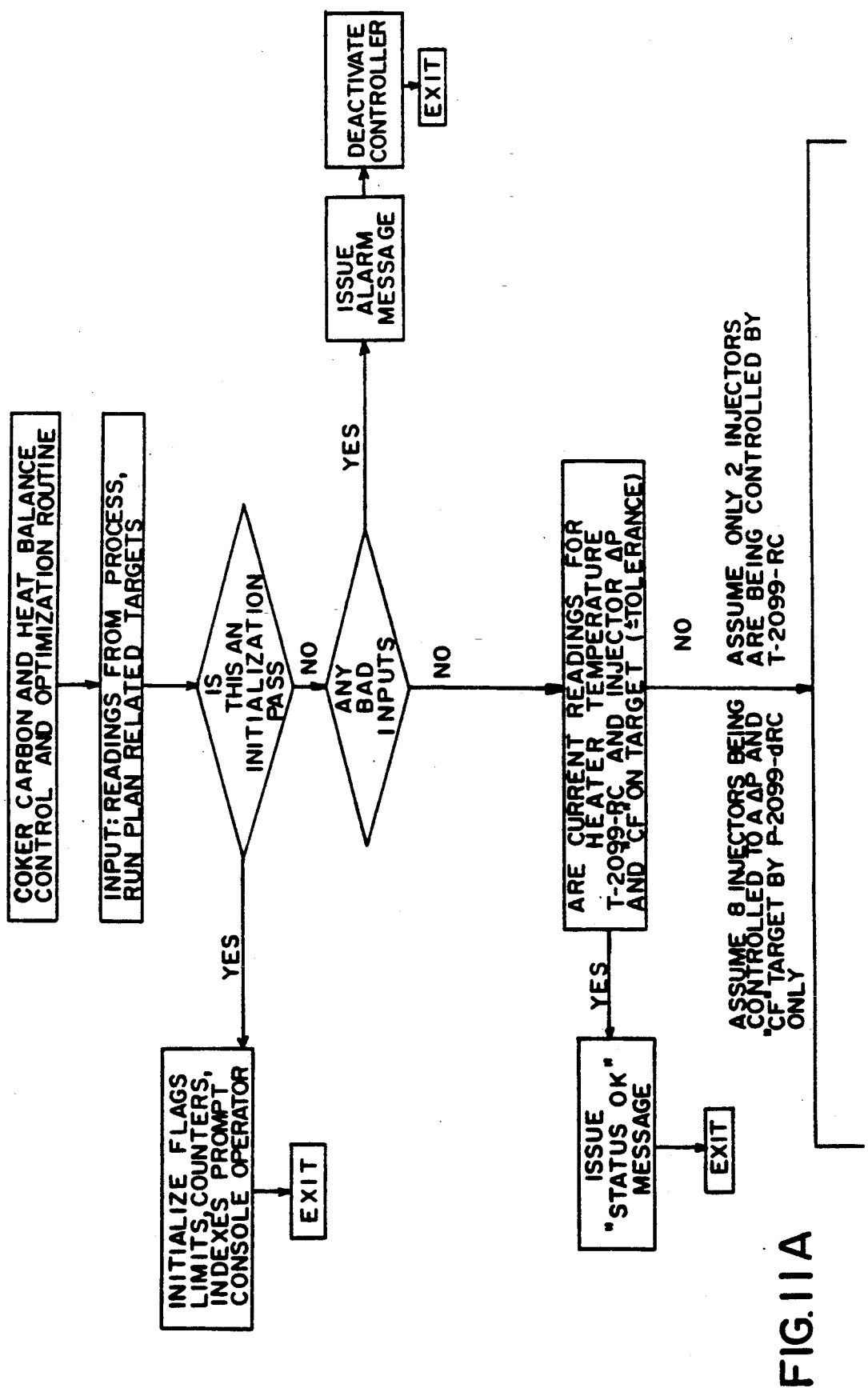
FIG. 11 (parts A and B) is a flow chart illustrating a computer application program for carrying out another preferred embodiment of the invention.
Figure 11B:
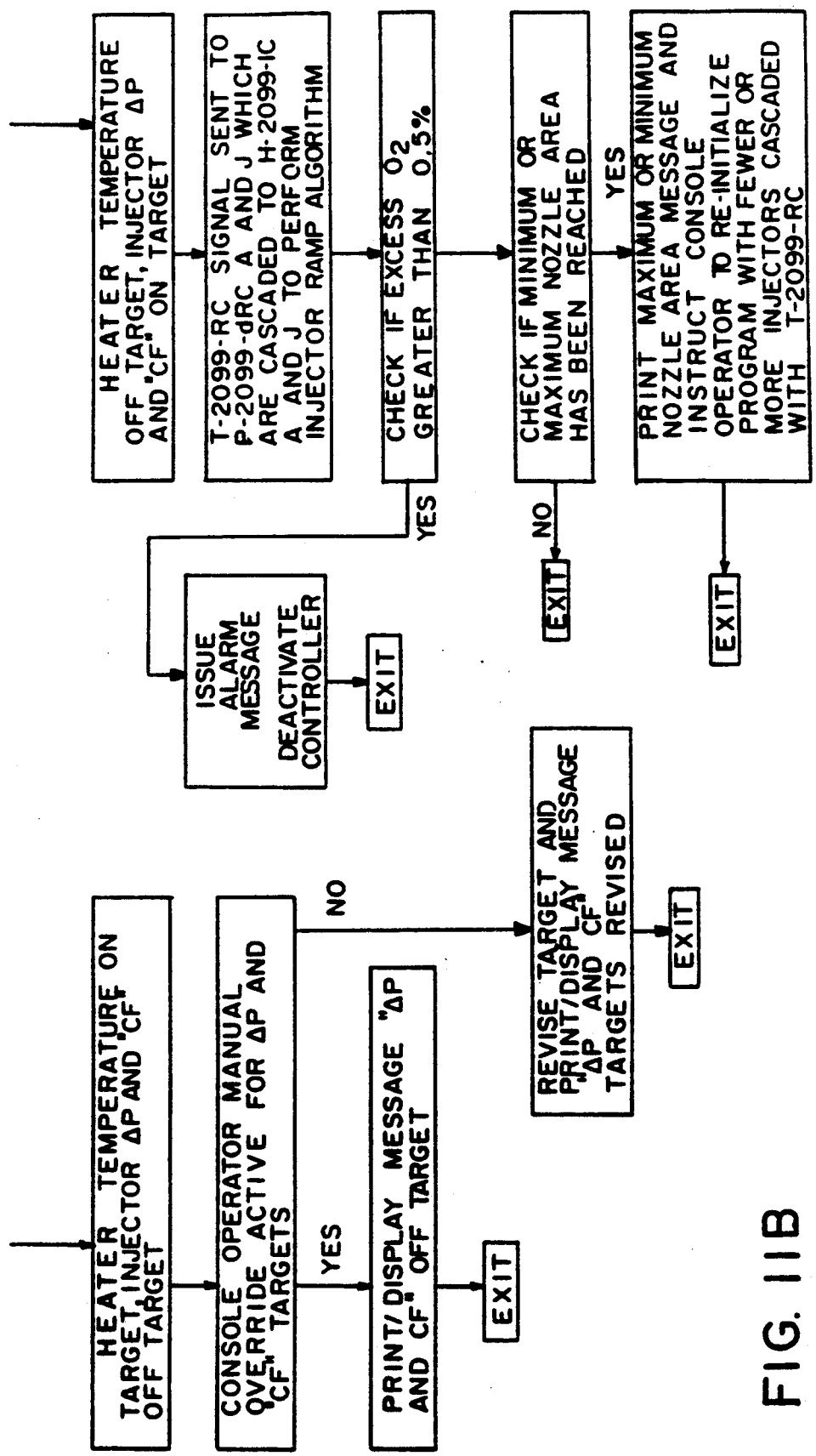

FIG. 10 (parts A and B) is a schematic illustrating the basic structure of a typical control computer application program to vary feed injector throat area based on reactor temperature control requirements as indicated by the T-2001RC controllers. It is based on a reference ten variable atomization means feed injector system with a PdRC controller cascaded to the injector actuator, HIC: P-2099-dRC A cascaded to H-2099-IC A, etc. The reactor temperature controller T-2001RC will generate controller signals in response to changes in the target set point. T-2001RC is cascaded to 20% of the total feed injectors. Console operator-supplied set points for P-2099-dRC (A to J) are based on a unit specific run plan to initialize the system. This set point is consistent with a target spray pattern/ degree of atomization. The calculated flow coefficient "CF" will be calculated in a real time frame. This "CF" will be used as an index of feed atomization.

EXAMPLE 3

In the above example, a fluid coking with gasification process control scheme was illustrated for application to a particular unit, using instrument tag ID numbers, etc. from the plant. This application could be applied to other fluid hydrocarbon conversion and cracking process units in a similar fashion, although unit-specific items might influence the final functional form of the application as well as location-specific cost issues associated with any revamp.

The control scheme detailed above is based on a "single stage" reactor configuration where the oil feed is introduced at a specific point along the length of the reactor. This scheme could also be applied to "multistage" reactor configurations where the oil feed is introduced at several points along the length of the reactor. When applied to a "multistage" configuration, various hybrid control configurations become possible. The matrix in Table 6 below illustrates how four distinct control schemes could optimally be applied to a two stage reactor configuration. For more than two stages, a much larger matrix is appropriate. A two stage system is viewed as a reasonable commercial configuration with three stages being a possible commercial "stretch case" depending on economics. The four distinct control schemes might typically be defined as follows: (1) total flow control, (2) reactor temperature control, (3) carbon and heat balance control, and (4) yield selectivity/quality control.

TABLE 6

Control Scheme Matrix - Two Stage Reactor Configuration (Tag numbers refer to the control schemes detailed above)

| Case: | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| Stage A | 1 | 1 | 1 | 1 | 2 | 2 | 2 | 2 | 3 | 3 | 3 | 3 | 4 | 4 | 4 | 4 | 2 | 3 | 4 | 1 | 3 | 4 | 1 | 2 | 4 | 1 | 2 | 3 |
| Stage B | 1 | 2 | 3 | 4 | 1 | 2 | 3 | 4 | 1 | 2 | 3 | 4 | 1 | 2 | 3 | 4 | 1 | 1 | 1 | 2 | 2 | 2 | 3 | 3 | 3 | 4 | 4 | 4 |

For a multi-stage reactor configuration, a commercial installation would probably install the necessary instrumentation to provide flexibility to operate in any one of the 28 possible configurations outlined above. Various run plan-specific and economic-specific items would tend to favor certain operating cases over others, but it would be difficult to predict which of the 28 possible cases would be the most attractive under all possible operating scenarios.

It will be understood that while there have been herein described certain specific embodiments of the invention, it is not intended thereby to have it limited to or circumscribed by the details given, in view of the fact that the invention is susceptible to various modifications and changes which came within the spirit of the disclosure and the scope of the appended claims.

What is claimed is:

1. An apparatus comprising:
   a reactor vessel including a riser connected thereto for fluid hydrocarbon conversion and cracking a hydrocarbonaceous feed;
   a means for introducing a fluidizing medium into said riser;
   a means for introducing catalyst in a particulate form into said riser;
   a means for removing from said reactor vessel said particulate catalyst for regeneration;
   a means for removing conversion products from said reactor vessel;

a plurality of feed injectors for injecting a hydrocarbonaceous feed into said reactor vessel, said feed injectors having an inlet end and an outlet end, which feed injectors are sealingly connected through a wall of said riser such that the outlet end protrudes into the interior of the reactor vessel, which injectors are comprised of a nozzle having an internal throat section in fluid communication with the interior of the reactor vessel and the source of the feed, wherein the cross-sectional flow area of said throat section can be varied by movement of a throat insert member therein;

a means for monitoring the temperature within the reactor vessel;

a means for generating a first signal based on said reaction temperature; and a controller means for responding to said first signal by adjusting the feed atomization by movement of the throat insert member of said injectors.

2. The apparatus of claim 1, further comprising a means for comparing said first signal to a second signal indicative of a preselected set point value and for adjusting said atomization to diminish any difference between said first and second signals.

3. The apparatus of claim 2, further comprising a means for producing a third signal indicative of the measured pressure drop $\Delta P$ across the feed injector.

4. The apparatus of claim 3, further comprising a means for producing a fourth signal based on the measurements of at least one component of the feed material going to the feed injector which components is selected from the group consisting of API gravity, refractive index and feed composition.

5. The apparatus of claim 3, further comprising a controller means for determining, based on said first, second, and third signals, a set point value for pressure drop across the nozzles of said feed injectors necessary to achieve a desired parameter selected from the group consisting of coke deposition and reactor temperature.

6. The apparatus of claim 4, further comprising a controller means for determining, based on said first, second, third, and fourth signals a set point value for pressure drop across the nozzles of said feed injectors necessary to achieve a desired parameter selected from the group consisting of coke deposition and reactor temperature.

7. The apparatus of claim 5, further comprising a means for adjusting said cross-sectional flow area of a portion of said feed injector to vary the pressure drop therethrough.

8. The apparatus of claim 6, further comprising a means for adjusting said cross-sectional flow area of a portion of said feed injector to vary the pressure drop therethrough by movement of said insert member in the feed injector.

9. The apparatus of claim 1, wherein said plurality of feed injectors is at least three feed injectors.

10. The apparatus of claim 1, wherein said feed injector comprises a nozzle tip having a geometry selected from the group consisting of fan, converging, diverging, converging-diverging, converging-diverging fan, full cone, spiral and spiral-swirl.

11. The apparatus of claim 1, wherein said feed injector partially extends into the riser and is connected thereto by a thermal sleeve.

12. The apparatus of claim 8, wherein said throat insert member is connected to the distal end of a shaft.

13. The apparatus of claim 1, wherein said feed injector further comprises a gas inlet for introducing a gas upstream of said nozzle of said feed injector to assist in atomization of the feed.

14. The apparatus of claim 10, wherein a shaft packing gland allows for modulation of said throat insert member.

15. The apparatus of claim 1, wherein a plurality of feed injectors is uniformly distributed around the perimeter of said riser reactor.

16. The apparatus of claim 1, wherein a plurality of feed injectors are located at a plurality of levels along the longitudinal axis of said riser of said reactor vessel or both.

* * * * *